United States Patent [19]

Candor

[11] Patent Number: 4,877,503
[45] Date of Patent: * Oct. 31, 1989

[54] APPARATUS AND METHOD FOR REMOVING LIQUID FROM LIQUID BEARING MATERIAL

[76] Inventor: James T. Candor, 5440 Cynthia La., Dayton, Ohio 45429

[*] Notice: The portion of the term of this patent subsequent to Aug. 30, 2005 has been disclaimed.

[21] Appl. No.: 284,197

[22] Filed: Dec. 14, 1988

Related U.S. Application Data

[63] Continuation-in-part of Ser. No. 213,709, Jun. 30, 1988, abandoned, which is a continuation-in-part of Ser. No. 189,974, May 4, 1988, abandoned, which is a continuation-in-part of Ser. No. 62,201, Jun. 15, 1987, Pat. No. 4,780,188, which is a continuation-in-part of Ser. No. 32,746, Mar. 31, 1987, Pat. No. 4,767,514.

[51] Int. Cl.[4] .................. B03C 5/00; B03C 5/02; B01D 57/02
[52] U.S. Cl. .................. 204/182.1; 204/182.3; 204/183.1; 204/186; 204/304; 204/307; 204/302
[58] Field of Search ............... 204/299 R, 300 R, 302, 204/304, 307, 182.1, 182.3, 183.1, 182.2, 180.1, 186

[56] References Cited

U.S. PATENT DOCUMENTS

| | | | |
|---|---|---|---|
| 3,931,682 | 1/1976 | Candor | 34/1 |
| 4,236,317 | 12/1980 | Candor | 34/1 |
| 4,341,617 | 7/1982 | King | 204/302 |
| 4,443,320 | 4/1984 | King | 204/302 |
| 4,561,953 | 12/1985 | Muralidhara et al. | 204/182.3 |
| 4,747,920 | 5/1988 | Muralidhara et al. | 204/182.3 |
| 4,767,514 | 8/1988 | Candor | 204/304 |
| 4,780,188 | 10/1988 | Candor | 204/304 |

OTHER PUBLICATIONS

Chapter 14, pp. 335-374 of the book *Advances in Solid—Liquid Separation* (11/12/86).
"Effect of a Corona Discharge Field on Evaporation of Liquids from Capillaries" by Karpovich et al., J. Eng. Phys., 1981, 41, 1333.
"Study of Electric Fields-Induced Effects on Water Vapor Adsorption in Porous Adsorbents" by Someshwar et al., Ind. Eng. Chem. Fundam., 1985, 24, 215-220.
"Effect of an Electric Field on the Kinetics of Water Sorption by a Capillary-Porous Material" by Panchenko et al., J. Eng. Phys., 1972, 22, 554.
"Influence of Inhomogeneous Electric and Magnetic Fields on Internal Mass Transfer in Capillary-Porous Bodies" by Panasyuk et al., J. Eng. Phys., 1978, 35, 827.

*Primary Examiner*—John F. Niebling
*Assistant Examiner*—Ben C. Hsing
*Attorney, Agent, or Firm*—Candor, Candor & Tassone

[57] ABSTRACT

An apparatus and method for removing liquid from liquid bearing material are provided, the apparatus comprising a pair of spaced apart electrodes for being disposed on opposite sides of the material, a unit for creating an electrostatic field between the electrodes for acting through the material to remove liquid from the material, and a projection extending from one of the electrodes so as to be disposed in the material between the electrodes to assist in removing liquid from the liquid bearing material, the electrodes comprising a pair of movable endless belts having adjacent runs thereof adapted to move in the same direction with the material therebetween so as to move in the same direction therewith, the projection being adapted to project from the one electrode to different positions thereof relative to the material between the electrodes and relative to the one electrode.

44 Claims, 5 Drawing Sheets

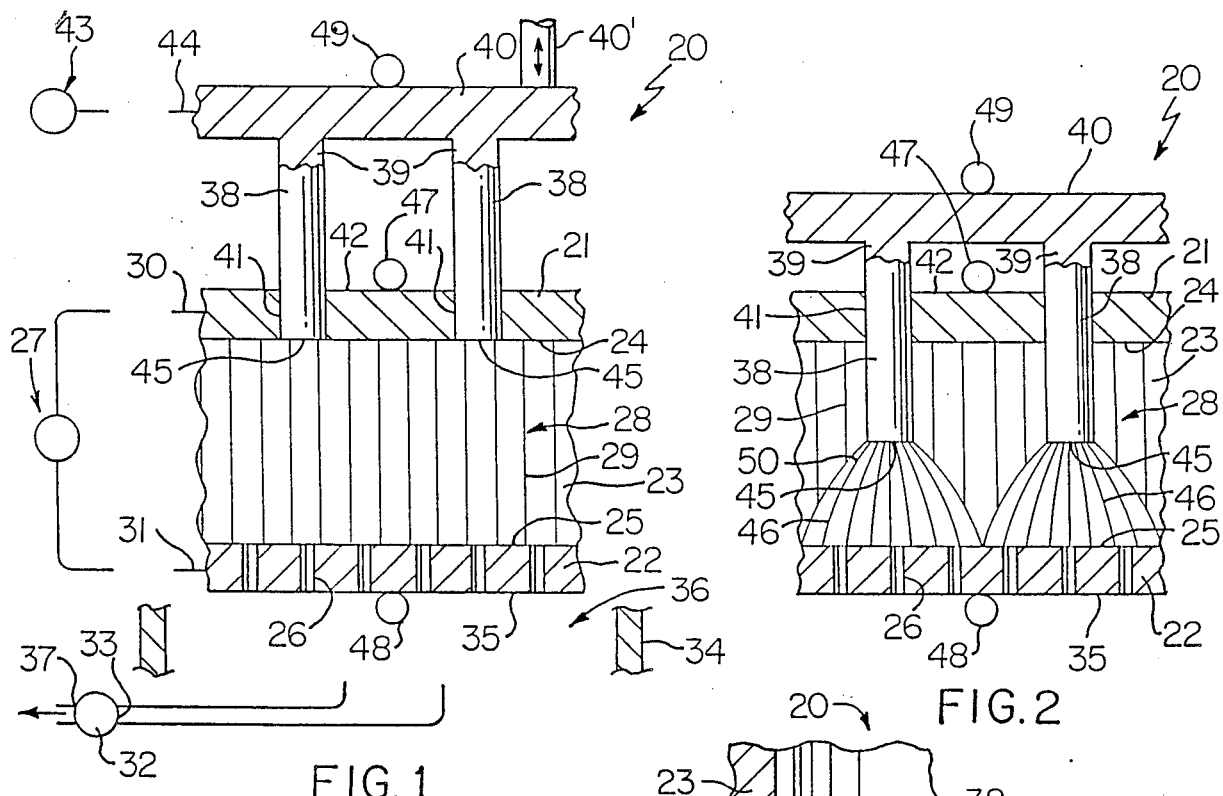
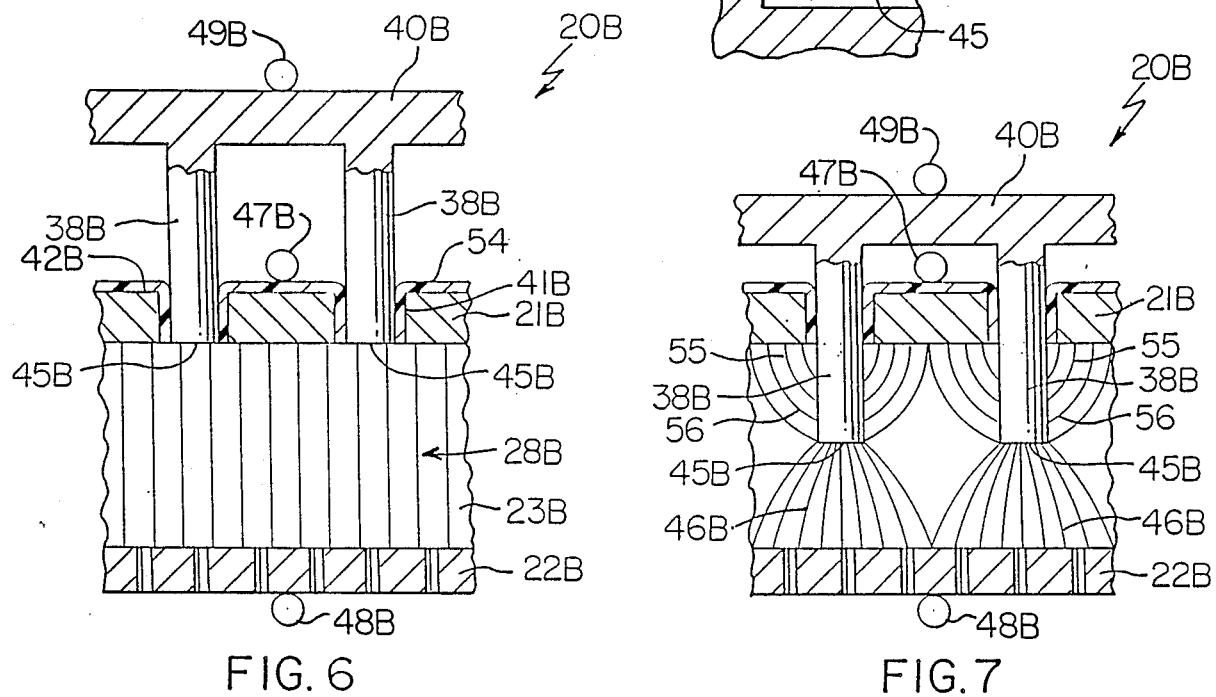

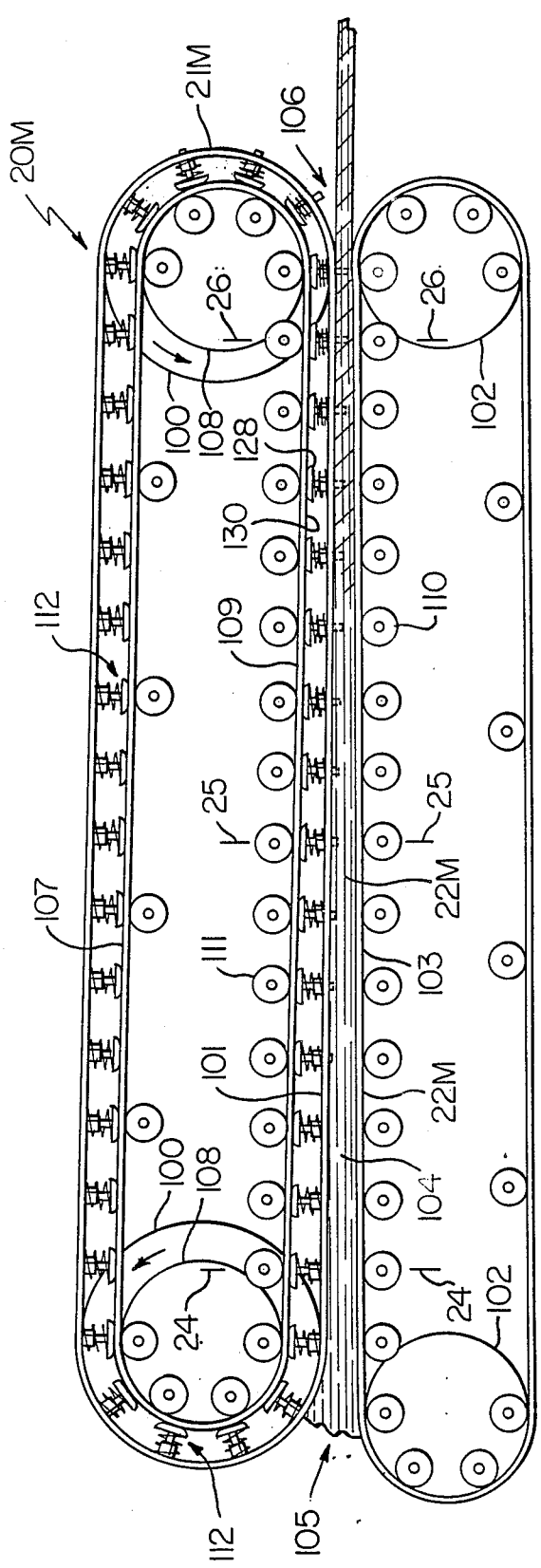

APPARATUS AND METHOD FOR REMOVING LIQUID FROM LIQUID BEARING MATERIAL

CROSS-REFERENCE TO RELATED APPLICATIONS

This application is a continuation-in-part patent application of its copending parent patent application, Ser. No. 213,709, filed June 30, 1988, which, in turn, is a continuation-in-part patent application of its copending parent patent application, Ser. No. 189,974, filed May 4, 1988, which, in turn, is a continuation-in-part patent application of its copending parent patent application, Ser. No. 062,201, filed June 15, 1987, now U.S. Pat. No. 4,780,188, which, in turn, is a continuation-in-part patent application of its copending parent patent application, Ser. No. 032,746, filed March 31, 1987, now U.S. Pat. No. 4,767,514.

BACKGROUND OF THE INVENTION

1. Field of the Invention

This invention relates to a new apparatus for removing liquid from liquid bearing material and to a new method for removing liquid from liquid bearing material.

2. Prior Art Statement

It is known to provide an apparatus for removing liquid from liquid bearing material and comprising a pair of spaced electrodes for being disposed on opposite sides of the material, means for creating an electrostatic field between the electrodes for acting through the material to remove liquid from the material, and a projection extending from one of the electrodes so as to be disposed in the material between the electrodes to assist in removing liquid from the liquid bearing material, the electrodes comprising a pair of movable endless belts having adjacent runs thereof adapted to move in the same direction with the material therebetween so as to move in the same direction therewith. For example, see the U.S. patent to Candor, U.S. Pat. No. 4,236,317.

It is also known to have the projection of an arrangement project through an opening means passing through one of the electrodes. For example, see the U.S. patent to King, U.S. Pat. No. 4,341,617.

While the aforementioned U.S. patent to Candor, U.S. Pat. No. 4,236,317, also describes that the projection and the electrodes can be sonically or ultrasonically vibrated while the projection is projecting into and/or through the liquid bearing material that is disposed between the electrodes for further enhancing the electrostatic action in removing liquid from the liquid bearing material, also see the U.S. patent to Candor, U.S. Pat. No. 3,931,682; the U.S. patent to Muralidhara et al, U.S. Pat. No. 4,561,953, the U.S. patent to Muralidhara et al, U.S. Pat. No. 4,747,920, and Chapter 14, pages 335–374, of the book *Advances in Solid-Liquid Separation* edited by H. S. Muralidhara for other examples of apparatus that utilize sonic or ultrasonic vibrations in combination with an electrostatic field to remove liquid from liquid bearing material.

It is also known that liquid in capillaries or porous material tends to physically move in the direction of increasing field inhomogeneity to the capillary or pore mouth when an inhomogeneous electrostatic or electric field or non-uniform electrostatic or electric field is directed across that capillary or porous body. For example, see the article "Effect of a Corona Discharge Field On Evaporation of Liquids From Capillaries" by Karpovich et al, J. Eng. Phys., 1981, 41, 1333. In addition, see the article "Study of Electric Field-Induced Effects on Water Vapor Adsorption in Porous Adsorbents" by Someshwar et al, Ind Eng. Chem. Fundam., 1985, 24, 215–220; the article "Effect of an Electric Field on the Kinetics of Water Sorption by a Capillary-Porous Material" by Panchenko et al, J. Eng. Phys., 1972, 22, 554 and the article "Influence of Inhomogeneous Electric and Magnetic Fields on Internal Mass Transfer In Capillary-Porous Bodies" by Panasyuk et al, J. Eng. Phys., 1978, 35, 827.

SUMMARY OF THE INVENTION

One feature of this invention is to provide a new apparatus and method for removing liquid from liquid bearing material by disposing a projection in the material between the electrodes in a unique manner to assist in removing liquid from the liquid bearing material.

In particular, it is believed according to the teachings of this invention that one of the electrodes that is disposed on opposite sides of the liquid bearing material can have a projection adapted to extend therefrom so as to project into the material between the electrodes to different positions thereof relative to the material between the electrodes and relative to that one electrode.

For example, one embodiment of this invention provides an apparatus for removing liquid from liquid bearing material and comprising a pair of spaced apart electrodes for being disposed on opposite sides of the material, means for creating an electrostatic field between the electrodes for acting through the material to remove liquid from the material, a projection extending from one of the electrodes so as to be disposed in the material between the electrodes to assist in removing liquid from the liquid bearing material, the electrodes comprising a pair of movable endless belts having adjacent runs thereof adapted to move in the same direction with the material disposed therebetween so as to move in the same direction therewith, the projection being adapted to project from the one electrode to different positions thereof relative to the material between the electrodes and relative to that one electrode.

Accordingly, it is an object of this invention to provide a new apparatus for removing liquid from liquid bearing material and having one or more of the novel features of this invention as set forth above or hereinafter shown or described.

Another object of this invention is to provide a new method for removing liquid from liquid bearing material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary cross-sectional view that schematically illustrates the apparatus and method of this invention for removing liquid from liquid bearing material.

FIG. 2 is a view similar to FIG. 1 and illustrates the apparatus of FIG. 1 in another operating position thereof.

FIG. 2A is a fragmentary view of FIG. 2 and illustrates in an exaggerated manner how the vibration of the projection in the material might form a cavity in the resulting cake around the vibrating projection.

FIG. 6 is a view similar to FIG. 1 and illustrates another apparatus and method of this invention.

FIG. 7 is a view similar to FIG. 6 and illustrates the apparatus of FIG. 6 in another operating position thereof.

FIG. 23 is a schematic side view similar to FIG. 1 and illustrates another apparatus and method of this invention.

FIG. 24 is an enlarged fragmentary view of the apparatus and method illustrated in FIG. 23 and is taken in the general area of the lines 24—24 thereof.

FIG. 25 is a view similar to FIG. 24 and is taken in the general area of the lines 25—25 of FIG. 23.

FIG. 26 is a view similar to FIG. 24 and is taken in the general area of the lines 26—26 of FIG. 23.

DESCRIPTION OF THE PREFERRED EMBODIMENTS

Figure 3:
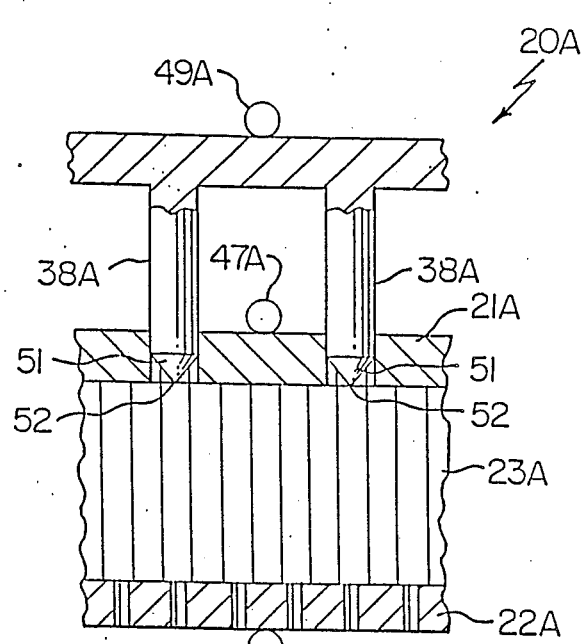
FIG. 3 is a view similar to FIG. 1 and illustrates another apparatus and method of this invention.

While the various features of this invention are hereinafter described and illustrated as being particularly adapted to provide an apparatus and method for dewatering certain types of liquid bearing material, it is to be understood that the various features of this invention can be utilized singly or in various combinations thereof to remove liquid from other types of liquid bearing material or to merely reduce the liquid content of a liquid bearing material with the resulting dewatered product still being considered as being relatively liquid.

Therefore, this invention is not to be limited to only the embodiments illustrated in the drawings, because the drawings are merely utilized to illustrate some of the wide variety of uses of this invention.

Referring now to FIGS. 1 and 2, the method and apparatus of this invention is generally indicated by the reference numeral 20 and comprises a pair of spaced apart electrodes 21 and 22 disposed on opposite sides of a liquid bearing material 23, such as a slurry of a liquid and particles, fibers, etc., the electrodes 21 and 22 being formed of any suitable electrically conductive material and respectively having facing sides 24 and 25 for being disposed in engagement with the material 23 in any of the manners set forth in the aforementioned five U.S. patents and Chapter 14 of the book *Advances in Solid-Liquid Separation* whereby the U.S. Patents to Candor, U.S. Pat. Nos. 4,236,317 and 3,931,682; the U.S. Patents to Muralidhara et al, U.S. Pat. Nos. 4,561,953 and 4,747,920; the U.S. Patent to King, U.S. Pat. No. 4,341,617 and Chapter 14 of the book *Advances in Solid-Liquid Separation* edited by H. S. Muralidhara are being incorporated into this disclosure by this reference thereto not only for the teachings of the apparatus and methods thereof but also for the teachings of some of the types of liquid bearing materials that can be utilized in the apparatus and method 20 of this invention.

Thus, it can be seen that the electrodes 21 and 22 can comprise part of a stationary apparatus wherein the only movement of the electrodes 21 and 22 is that the electrode 21 can move toward the electrode 22 as the liquid in the liquid bearing material 23 is being removed therefrom in a manner hereinafter set forth or that the electrodes 21 and 22 can comprise movable endless belt means for continuously dewatering the material 23 disposed therebetween together with the belt means 21 being movable toward the belt means 22 as the liquid in the liquid bearing material 23 is being removed therefrom as will be apparent hereinafter.

In any event, the lower electrode 22 has a plurality of passages 26 passing completely therethrough and normally being of a size that will permit liquid of the liquid bearing material 23 to pass therethrough without a substantial amount of the solid particles of the material 23 passing through the passages 26 in a manner well known in the art of dewatering material, such an suspensions, slurries or sludges of particles and liquids, etc.

The apparatus 20 comprises means 27 for creating an electrostatic field or electric field 28 between the electrodes 21 and 22 for acting through the material 23 to remove liquid from the material 23 by the well-known phenomena of electrophoresis and electro-osmosis, the electrostatic field 28 being generally uniform and theoretically having a plurality of field lines 29 that are disposed in spaced parallel relation and extend at right angles between the facing surfaces 24 and 25 of the electrodes 21 and 22 as illustrated in FIG. 1.

The means 27 creates such electrostatic field 28 by at least charging one of the electrodes 21 and 22 with either a negative or a positive potential while either oppositely charging the other of the electrodes 21 and 22 or grounding such other electrodes 21 or 22, the means 27 being adapted to maintain the desired amount of potential differential between the electrodes 21 and 22 from just a few volts to many kilovolts such as desired, even though there may be an electrical current flow created between the electrodes 21 and 22.

However, in the embodiment illustrated in FIG. 1, the means 27 is adapted to charge the electrode 21 with one potential through a lead 30 that is disposed in electrical contact with the electrode 21 and to oppositely charge the electrode 22 through a lead 31 that is electrically interconnected to the electrode 22 as illustrated.

It is generally well known that if the electrode 21 is positively charged and the electrode 22 is negatively charged with the particles of the liquid bearing material 23 being negatively charged, the resulting electrostatic field 28 causes the particles of the liquid bearing material 23 to migrate toward the electrode 21 by the phenomena of electrophoresis and the liquid of the liquid bearing material 23 to be forced through the passages 26 of the lower electrode 22 by the phenomena of electroosmosis.

In order to assist in the removal of the liquid from the liquid bearing material 23 as the electrostatic field 28 is being applied through the material 23 by the electrodes 21 and 22, a pressure differential is created across the electrode 22 by a suction device 32 having its inlet 33 disposed in fluid communication with a chamber defining means 34 that is disposed in substantial sealing relation with the lower surface 35 of the electrode 22 and defines a chamber 36 therewith which is in fluid communication with the inlet 33 of the suction device 32 so that the suction device 32 tends to draw the liquid through the passages 26 in the lower electrode 22 in a manner well known for an evacuating apparatus, the suction device 32 having an outlet 37 for dispensing the removed liquid from the suction device 32 in a manner well known in the art.

The apparatus 20 of this invention includes a plurality of needle-like projections 38 formed of any suitable conductive material and being adapted to project into the material 23 between the electrodes 21 and 22, such as illustrated in FIG. 2, to assist in the dewatering or in the liquid removal of the liquid of the liquid bearing material 23 for the reasons fully set forth in the aforementioned U.S. Patent to Candor, U.S. Pat. No. 4,236,317.

If desired, the projections 38 can each have an end 39 that is secured to a plate 40 so that as the plate 40 moves upwardly or downwardly in the drawings, the projections 38 will move in unison therewith, the plate 40 being illustrated in FIGS. 1 and 2 as being integral and one-piece with the projections 38 and thereby being formed of the same metallic material as the projections 38. However, it is to be understood that plate 40 could be formed of any other suitable material and could actually be formed of electrically insulating material as will be apparent hereinafter.

The upper electrode 21 is provided with a plurality of openings 41 passing completely through the outer surface 42 and the inner surface 24 thereof and respectively receive the projections 38 therein so that the projections 38 can pass through the openings 41 to be received into the space between the electrodes 21 and 22 depending upon the position of the plate 40 relative to the electrode 21.

The projections 38 are adapted to have a desired electrical potential imposed thereon by any suitable means and the means 27 previously described can be utilized for such purpose. However, a separate means can be utilized for charging the projections 38 and such separate means is generally indicated by the reference numeral 43 in the drawings and is adapted to charge the plate 40 and, thus, the projections 38 through a suitable lead 44 that is electrically interconnected to the plate 40 in any suitable manner.

The projections 38 each has a diameter that substantially fills the diameter of its respective opening 41 of the electrode 21 and has a substantially flat end surface 45 that is adapted to be disposed substantially flush with the inside surface 24 of the electrode 21 in the manner illustrated in FIG. 1 so that not only does the liquid bearing material 23 become completely blocked from entering the openings 41 in the electrode 21, but also when the projections 38 are charged with a potential that is the same potential that the upper electrode 21 is being charged with by the means 27, the resulting electrostatic field 28 between the electrodes 21 and 22 is initially substantially uniform as illustrated in FIG. 1 by the uniformly spaced apart parallel field lines 29. However, as the projections 38 are being progressively moved into the material 23 as the plate 40 is being progressively moved toward the electrode plate 21 in the manner illustrated in FIG. 2, such as by suitable ram means or the like 40', FIG. 1, the end surfaces 45 of the projections 38 create substantially non-uniform electrostatic fields or electric fields 46 with the lower electrode 22 in the manner illustrated in FIG. 2 while the electrode 21 is still tending to maintain the substantially uniform field 28 with the lower electrode 22 whereby the fields 28 and 46 are respectively imposed on the material 23 for a purpose hereinafter described.

While the ram means 40' is only shown in FIG. 1, it is to be understood that such ram means 40' or other moving means is operatively interconnected to the movable projections in all of the other embodiments of this invention in a like manner, such ram means being of any suitable type and being operated by any suitable force applying means as is well known in the press art or the like. For example, see the U.S. patent to Moeglich, U.S. Pat. No. 4,244,804; the U.S. patent to Weaver, U.S. Pat. No. 4,380,251 and the U.S. patent to Weaver, U.S. Pat. No. 4,458,710 for such moving means or ram means whereby these three patents are being incorporated into this disclosure by this reference thereto.

If desired, the electrode 21, the electrode 22 and the projections 38 can be sonically or ultrasonically vibrated in any suitable manner during the dewatering operation of the apparatus 20 of this invention, such sonic or ultrasonic vibration imparting means being respectively illustrated by devices 47, 48 and 49 and being of any suitable type, such as being of the sonic and ultrasonic vibrating types set forth in the aforementioned three U.S. patents and book. However, it is to be understood that only the projections 38 need be vibrated, only the upper electrode 21 needs to be vibrated, only the lower electrode 22 needs to be vibrated or any desired combination thereof needs to be vibrated as desired.

For example, the vibrator devices 47, 48 and 49 can each be of the type set forth in the U.S. patent to Rines, U.S. Pat. No. 2,744,860; the U.S. patent to Bodine, U.S. Pat. No. 3,472,295; the U.S. patent to Shoh, U.S. Pat. No. 4,016,436; the U.S. patent to Morton et al, U.S. Pat. No. 4,741,839 and the U.S. patent to Beard et al, U.S. Pat. No. 4,729,175 as it is believed that the devices thereof can be respectively disposed against the plates 21, 22 and 40 and not only cause the plates 21, 22 and 40 to vibrate therewith, but also to cause the projections 38 and the material 23 to be vibrated thereby whereby these five patents are being incorporated into this disclosure by this reference thereto.

Therefore, it can be seen that the method and apparatus 20 of this invention can be formed of relatively simple parts to operate in a manner now to be described.

With the projections 38 disposed in the up position illustrated in FIG. 1 wherein the lower surfaces 45 thereof are disposed substantially flush with the lower surface 24 of the upper electrode 21, the moisture bearing material 23 is disposed between the electrodes 21 and 22 so as to be in electrical contact with the lower surface 24 of the upper electrode 21 and in electrical contact with the upper surface 25 of the lower electrode 22. The means 27 and 43 are operated in such a manner that the upper electrode 21 and projections 38 are provided with a positive charge of the same value while the lower electrode 22 is provided with an equal and opposite negative charge so that a substantially uniform electrostatic field 28 is formed between the lower electrode 22 and the upper electrode 21 and ends 45 of the projections 38 as illustrated in the drawings to act through the moisture bearing material 23 and thereby to begin the dewatering of the material 23 by causing the liquid to flow through the passages 26 by the phenomenon of electro-osmosis while the particles of the material 23 tend to migrate or move toward the upper electrode 21 by the phenomenon of electrophoresis. Of course, if the particles of the material 23 are already in a preset condition thereof so that the same will not move toward the electrode 21, such as would be the case as if the material 23 was a closely packed sludge cake, a mat of fibrous material, etc., the liquid of the material 23, nevertheless, will tend to move toward the lower electrode 22 and pass out of the passages 26 thereof by the phenomenon of electro-osmosis and the suction being created by the suction device 32 and acting in the chamber 36 to tend to evacuate the chamber 36 will assist such electrostatic field 28 in removing the liquid from the liquid bearing material 23. In addition, by sonically or ultrasonically vibrating the material 23 between the electrodes 21 and 22 by any one or all of the means 47, 48 and 49, such vibrating action coupled with the electrostatic field action 28 will further tend to remove liquid from the material 23 as fully set forth in the aforementioned three U.S. patents and book and, therefore, the theories for such liquid removal need not be further discussed.

However, at any desired time during such dewatering operation of the apparatus 20 on the material 23, the plate 40 can be moved downwardly toward the electrode 21 so as to cause the projections 38 to begin to project into the material 23 below the surface 24 of the upper electrode 21 whereby the ends 45 of the projections 38 begin to form the non-uniform electrostatic fields 46 with the lower electrode 22 and it is believed that the non-uniform fields 46 create a greater dewatering effect on the material 23 than is provided by a uniform electrostatic field.

In particular, it is believed that because the non-uniform fields 46 have the field lines 50 thereof disposed more closely adjacent each other the closer the same are to the ends 45 of the projections 38 as illustrated in FIG. 2, such more intense portions of the electrostatic fields 46 more closely pack the particles of the liquid material 23 together than if the fields 46 had been uniform adjacent the surfaces 45 of the projections 38 to thereby cause a greater dewatering from those particles being more closely compacted not only by the squeezing action between the particles of the material 23, but also by the electro-osmotic effect of the more intense positions of the non-uniform fields 46.

In addition, because some of the particles in the liquid bearing material 23 may not be charged or be chargeable, the more intense portions 50 of the non-uniform fields 46 pack such particles together by the theory of dielectrophoresis. For example, see the U.S. Patent to Jordan et al, U.S. Pat. No. 4,164,460, which is being incorporated into this disclosure by this reference thereto.

Thus, it is believed that as the projections 38 have their ends 45 thereof moved downwardly and further away from the lower surface 24 of the upper electrode 21, such non-uniform fields 46 act on the material 23 in the above manner with the fields 46 becoming more non-uniform as the ends 45 of the projections 38 approach the upper surface 25 of the lower electrode 22. In fact, the length of the projections 38 could be such that the projections 38 will actually eventually engage against the surface 25 of the lower electrode 22 except that under such conditions there would be a direct shorting between the projections 38 and the lower electrode 22 whereby it may be desired to stop the movement of the projections 38 into the material 23 before the ends 45 of the projections 38 cause arcing or shorting to the lower electrode 22.

Therefore, it can be seen that initially the apparatus 20 provides a uniform electrostatic or electric field 28 between the electrodes 21 and 22 and then subsequently provides a combination of uniform field 28 and non-uniform electrostatic or electric fields 46 in a manner believed to more greatly dewater the material 23 either at a faster rate and/or with a greater amount of liquid removal than if the projections 38 were not being utilized and only the uniform field 28 was being provided between the electrodes 21 and 22 regardless of whether or not the vibration and suction means are being utilized in combination therewith or not.

After the material 23 has been dewatered a desired amount by the apparatus 20, the material 23 can be readily removed therefrom by merely raising the plate 40 relative to the electrode 21 to remove the projections 38 from the space between the electrodes 21 and 22, such raising of the plate 40 causing the upper electrode 21 to strip any material that would tend to stick to the projections 38 off of the projections 38 as the same are removed to the position illustrated in FIG. 1 so that the material 23 can be removed from the apparatus 20 in any suitable manner, such as by removing the electrode 21 and plate 40 if the apparatus 20 is a batch apparatus or by having the material 23 removed out from between the electrodes 21 and 22 at the end of the belt travel thereof as in the case of the aforementioned U.S. Patent to Candor, U.S. Pat. No. 4,236,317.

Of course, the projections 38 can be utilized for dewatering by also moving the projections 38 back upwardly from their down positions to the up position of FIG. 1 or could be moved many times upwardly and downwardly within the material 23 to cause a dewatering of the material 23. In fact, the projections 38 can begin the dewatering operation thereof when the same are fully disposed downwardly in the material 23 so that the dewatering action takes place as the projections 38 are merely being moved upwardly from their fully down position to their fully up position. Likewise, the projections 38 can begin the dewatering process in any position thereof whether the same are projected into the material a certain amount, the full amount or not into the material 23 at all as the case may be and then the projections 38 may be operated in any manner and degree of projection and rates of movement thereof during the dewatering process in order to provide for an optimum dewatering action therewith.

In addition, it may be found that it is desirable to change the value of the potential differential between the projections 38 and the lower electrode 22 during the various positions of the projections 38 relative to the electrode 22 so as to vary the intensity of the non-uniform fields 46 during the dewatering operation.

Also, it is to be understood that the ends 45 of the projections 38 can be shaped in any suitable manner so as to enhance not only the projecting action thereof into the material 23, but also to enhance the shape of the non-uniform fields 46 being created thereby.

Figure 4:
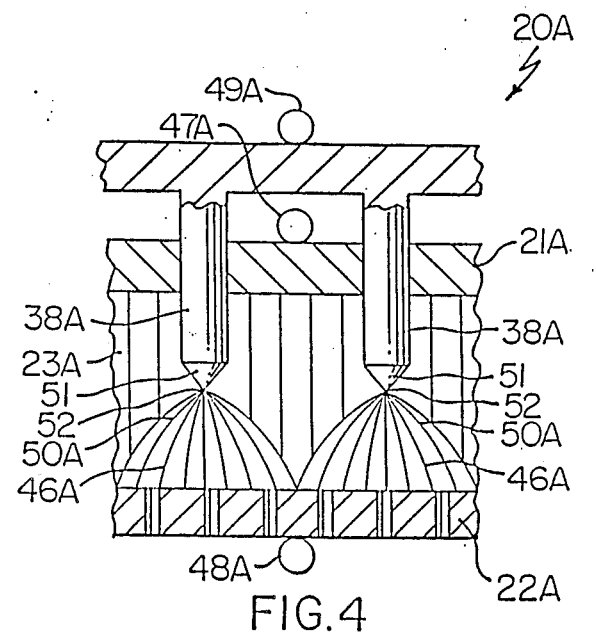
FIG. 4 is a view similar to FIG. 3 and illustrates the apparatus of FIG. 3 in another operating position thereof.
Figure 5:
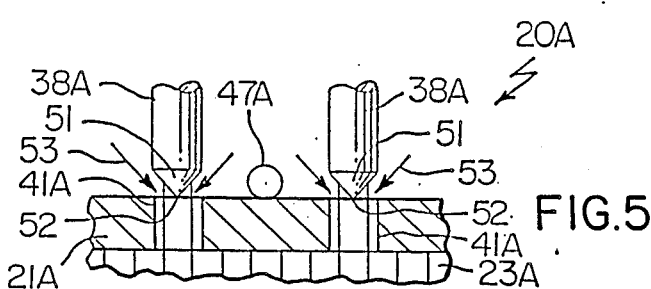
FIG. 5 is a fragmentary view similar to FIG. 3 and illustrates the apparatus thereof in still another operating position thereof.

For example, another method and apparatus of this invention is generally indicated by the reference numeral 20A in FIGS. 3-5 and parts thereof similar to the parts of the method and apparatus 20 previously described are indicated by like reference numerals followed by the reference "A".

In regards to the method and apparatus 20A illustrated in FIGS. 3-5 and the other embodiments of this invention as illustrated in FIGS. 6-15, it is to be understood that such methods and apparatus can have the suction means 32 and chamber defining means 34 utilized therewith as well as the charging means 27 and 43 previously described as the same are merely not illustrated in FIGS. 3-20 (as well as in FIG. 2) in order to simplify the drawings and not for the purpose of indicating that such means are not being utilized therewith. In fact, the embodiments illustrated in FIGS. 8-15 merely illustrate one projection and it is to be understood that a plurality of like projections would be utilized therewith. However, it is to be understood that each embodiment of this invention need only have one movable projection rather than a plurality thereof, if desired. Also, the embodiments illustrated in FIGS. 8-15 do not provide the vibrating means 47, 48 and 49 as provided in FIGS. 1-5 and it is to be understood that such vibration means would be utilized with the embodiments illustrated in FIGS. 8-15 if desired.

As illustrated in FIGS. 3-5, it can be seen that the apparatus and method 20A is substantially the same as the method and apparatus 20 previously described except that the projection means 38A respectively have substantially pointed end surface means 51 that are substantially conical and have sharp pointed apexes 52 whereby such pointed end surfaces 51 create the non-uniform electrostatic fields 46A previously described with the lower electrode means 22A but with the more intense portions 50A of the fields 46A being more intense than the intense portions 50 of the non-uniform fields 46 previously described because of the pointed arrangement 51, 52 of the projection means 38A. Thus, it is believed that a greater amount of dewatering will be created by the more intense portions 50A of the non-uniform fields 46A than by the intensive portions 50 of the non-uniform fields 46 previously described.

Therefore, since the operation of the method and apparatus 20A is substantially the same as the operation of the method and apparatus 20 previously described, a further description of the operation of the method and apparatus 20A is not necessary.

While the methods and apparatus 20 and 20A previously described each has the means 32 for creating a pressure differential across the lower electrode 22 or 22A, it is to be understood that a pressure differential could be created also across the upper electrode 21 or 21A together with or without the means 32 for creating a pressure differential across the lower electrode 22 or 22A.

For example, reference is now made to FIG. 5 wherein it can be seen that the projections 38A of the apparatus 20A have been moved upwardly so as to provide means for directing air or any desired fluid under pressure as indicated by the arrows 53, into the openings 41A in the upper electrode 21A so as to create a pressure differential across the upper electrode 21A and thereby act on the liquid bearing material 23A to tend to force liquid from the material 23A out through the lower electrode 22A as previously set forth, such upper electrode pressure differential creating means and lower electrode pressure differential creating means also being provided in the aforementioned U.S. Patent to Candor, U.S. Pat. No. 3,931,682.

While the needle-like projections 38 and 38A have been illustrated and described as being, in effect, in electrical contact with their respective upper electrodes 21 and 21A whereby separate means for charging the projections 38 and 38A need not be provided because merely charging the electrode plates 21 and 21A will cause the projections 38 and 38A to be charged therefrom without requiring the extra charging means 43 previously described, it is to be understood that the needle-like projections of this invention can be insulated from the upper electrode that receives the same respectively through opening means of such upper electrode so that the projections can be charged with a different potential than the potential being imposed upon the electrode carrying such projections.

For example, reference is now made to FIGS. 6 and 7 wherein another apparatus and method of this invention is generally indicated by the reference numeral 20B and parts thereof similar to the parts of the method and apparatus 20 and 20A previously described are indicated by like reference numerals followed by the reference letter "B".

As illustrated in FIGS. 6 and 7, the apparatus and method 20B is substantially the same as the method and apparatus 20 previously described except that the upper electrode 21B carries electrically insulating means 54 that not only lines the opening means 41B thereof so as to prevent the projections 38B from making electrical contact with the upper electrode 21B, but also the insulating means 54 covers the upper surface 42B of the electrode 21B so that should the plate 40B for the needle-like projections 38B be charged with a charge different than the potential charge of the upper electrode 21B, a resulting field therebetween will be muted and thereby not adversely affect the operation of the apparatus 20B as hereinafter set forth.

The initial operation of the apparatus and method 20B of FIGS. 6 and 7 is substantially the same as the method and apparatus 20 of FIGS. 1 and 2 wherein the upper electrode 21B and plate 40B are charged with the same potential, such as positive, while the lower electrode 22B is charged with the opposite potential, such as negative, to create the uniform field 28B therebetween for acting on the material 23B disposed between the electrodes 21B and 22B.

Thereafter, the upper plate 40B is moved toward the upper electrode 21B so as to cause the projections 38B to now have the ends 45B thereof received within the material 23B and at a certain point in the depth of projection of the projections 38B into the material 23B, the potential to the upper electrode 21B can be changed to ground or to a negative potential that is opposite to the potential of the projections 38B such as by being charged with the same potential as the lower electrode 22B so that the projections 38B not only form the non-uniform fields 46B with the lower electrode 22B for the purpose previously described but also the projections 38B create upper non-uniform fields 55 with the upper electrode 21B to operate on the material 21B between the upper electrode 21B and the ends 45B of the projections 38B in such a manner that the more intense portions 56 of the upper non-uniform fields 55 tend to move the particles of the liquid bearing material 23B with a greater intensity toward the lower ends 45B of the projections 38B than if the fields had merely been uniform.

If desired, during the operation of the apparatus and method 20B, the charging of the upper electrode 21B can be changed from being charged with the same potential as the projections 38B back to being grounded or being charged with an opposite potential to the projections 38B and then again back to the same potential as the projections 38B during the time the projections 38B are being utilized intermediate the electrodes 21B and 22B to dewater the material 23B therebetween.

Other means of this invention for electrically insulating the projections from the electrode through which the projections are being moved is to insulate the projections themselves from the electrode receiving the same.

Figure 8:
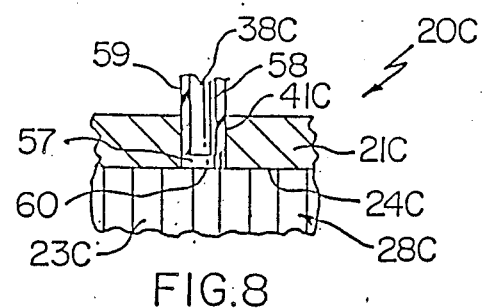
FIG. 8 is a fragmentary view similar to FIG. 1 and illustrates another apparatus and method of this invention.
Figure 9:
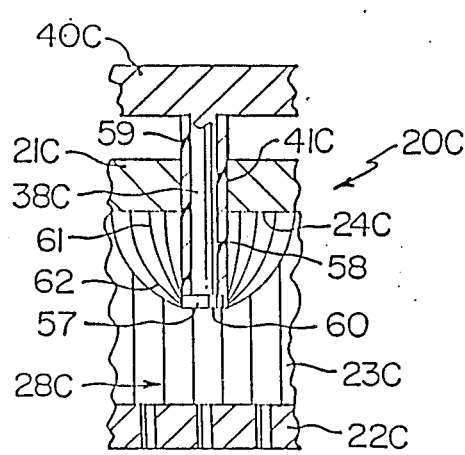
FIG. 9 is a view similar to FIG. 8 and illustrates the apparatus of FIG. 8 in another operating position thereof.

For example, reference is now being made to FIGS. 8 and 9 wherein another apparatus and method of this invention is generally indicated by the reference numeral 20C and parts thereof similar to the parts of the methods and apparatus 20-20B previously described are indicated by like reference numerals followed by the reference letter "C".

As illustrated in FIGS. 8 and 9, it can be seen that the projections 38C are each formed in a manner similar to a nail wherein the same has an enlarged disk-like head or end 57 and a substantially smaller diameter shaft-like portion or body 58 that is interconnected to the plate 40C, each head 57 having a diameter that is substantially the same as the diameter of its respective opening 41C that is formed through the upper electrode plate 21C as illustrated in FIG. 8. The shaft or body portion 38 of each projection 38C is covered with electrically insulating material 59 so that the projections 38C can readily move in their respective openings 41C from the position illustrated in FIG. 8 to the position illustrated in FIG. 9 while completely blocking any fluid flow through the openings 41C in the same manner as the projections 38 previously described.

In this manner, when the projections 38C are in the position illustrated in FIG. 8, it can be seen that the heads 57 of the projections 38C have their lower flat surfaces 60 disposed substantially flush with the lower flat surface 24C of the upper electrode 21C so that the upper electrode 21C can be charged with the same charge as the projections 38C to produce the uniform electrostatic field 28C previously described.

However, as the projections 38C are being moved into the material 23C in the manner illustrated in FIG. 9, by maintaining the charge on the projections 38C with the same potential as the electrode 21C, the projections 38C will form the non-uniform fields 46 with the lower electrode 22C as previously described.

However, by charging the projections 38C with the same potential as the lower electrode 22C and opposite to the upper electrode 21B, the enlarged heads 57 of the projections 38C will respectively form upper non-uniform fields 61 with the upper electrode 21C in such a manner that the more intense portions 62 of the non-uniform fields 61 will be adjacent the heads 57 of the projections 38C and tend to move the water toward the heads 57 with a greater intensity than the uniform field 28C as the projections 38C are completely insulated from the upper electrode 21C once the heads 57 have cleared the openings 41C in the electrode 21C.

Therefore, the charging of the projections 38C in the upper electrode 21C after the heads 57 of the projections 38C have been moved into the material 23C beyond the lower surface 24C of the upper electrode 21C permits any combination of charging between the projections 38C and the upper electrode 21C as desired.

While the various needle-like projections of this invention have been previously described as projecting through openings in the upper electrode of the various arrangements, it is to be understood that the projections of this invention can project through opening means in the lower electrode if desired.

Figure 10:
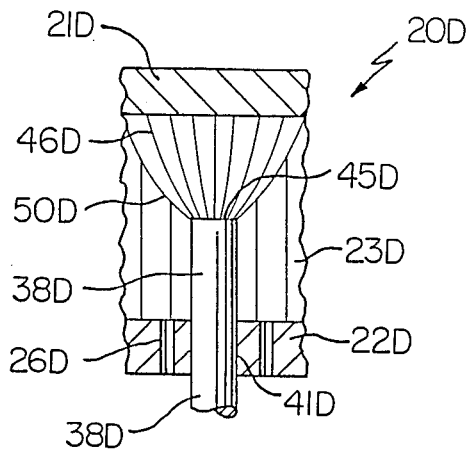
FIG. 10 is a view similar to FIG. 1 and illustrates another apparatus and method of this invention.
Figure 11:
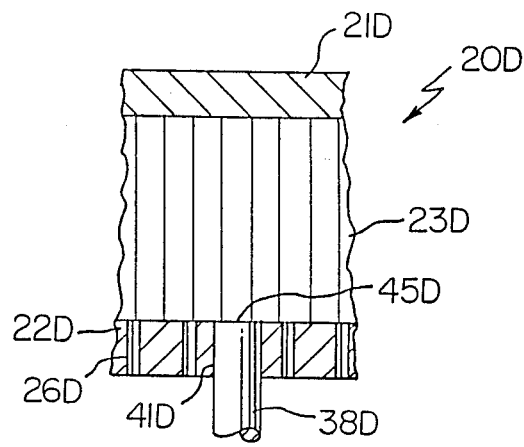
FIG. 11 is a view similar to FIG. 10 and illustrates the apparatus of FIG. 10 in another operating position thereof.

For example, reference is now made to FIGS. 10 and 11 wherein another apparatus and method of this invention is generally indicated by the reference numeral 20D and parts thereof similar to the parts of the apparatus and methods 20–20C previously described are indicated by like reference numerals followed by the reference letter "D".

As illustrated in FIGS. 10 and 11, the lower electrode 22D is provided with a plurality of openings 41D in addition to the passages 26D thereof for having the projections 38D respectively received therein so that the projections 38D can be charged with the same charge as the lower electrode 22D to form the non-uniform fields 46D with the upper electrode 21D so that the more intense portion 50D of each non-uniform field 6D is adjacent the end 45D of the respective projection 38D.

In fact, it may be found that it is best to start with the projections 38D fully projected into the material 23D at the start of the dewatering operation and subsequently pull the projections 38D down to the final position illustrated in FIG. 11. But, of course, the projections 38D could start in the position of FIG. 11 if desired or in any other position as previously described.

Figure 12:
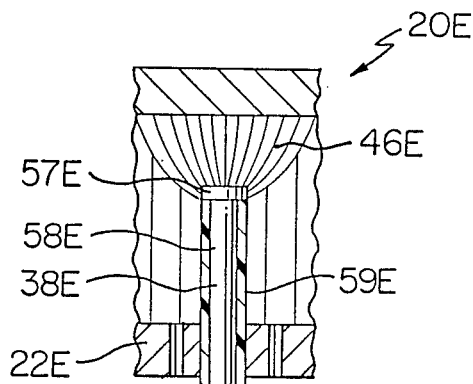
FIG. 12 is a view similar to FIG. 1 and illustrates another apparatus and method of this invention.
Figure 13:
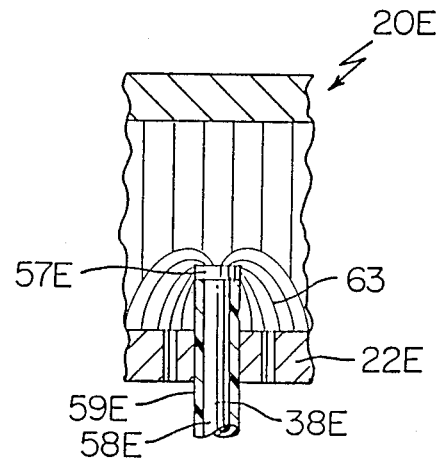
FIG. 13 is a view similar to FIG. 12 and illustrates the apparatus of FIG. 12 in another operating position thereof.

While the projections that project through the openings in the lower electrode of the arrangement of this invention can be insulated from such lower electrode in the same manner as illustrated in FIGS. 6 and 7, the projections are illustrated in FIGS. 12 and 13 as being insulated from the lower electrode in the same manner as the upper projections in FIGS. 8 and 9.

In particular, another method and apparatus of this invention is generally indicated by the reference numeral 20E in FIGS. 12 and 13 and parts thereof similar to the parts of the apparatus and methods 20–20D of this invention are indicated by like reference numerals followed by the reference "E".

As illustrated in FIGS. 12 and 13, the projections 8E have the enlarged heads 57E and have the body portions 58E thereof covered with insulation 59E so as to permit the electrodes 38E to be charged with a charge different than the charge on the lower electrode 22E, if desired.

For example, it can be seen in FIG. 13 that when the projection 38E is charged with a charge different than the charge on the lower electrode 22E and the projection 38E has the head 57E disposed within the material 23E between the electrodes 21E and 22E, a lower non-uniform electrostatic field 63 is formed between the head 57E and the lower electrode 22E with the non-uniform field 63 having its more intense portion 64 being disposed adjacent the head 57E as previously described.

Therefore, it can be seen that when the head 57E of a projection 38E is closer to the upper electrode 21E as illustrated in FIG. 12, the projection 38E can be provided with a charge that is opposite to the charge of the upper electrode 21E to create the upper non-uniform field 46E in the same manner as the upper non-uniform field 46D previously described. However, as the projection 38E has its end 57E moved closer to the lower electrode 22E, the charge on the projection 38E can be changed to be opposite to the charge on the lower electrode 22E to form the lower non-uniform electrostatic field 63 as illustrated in FIG. 13.

While the various apparatus and methods of this invention previously described have the plurality of needle-like projection means either being disposed through the upper electrode or through the lower electrode, it is to be understood that the needle-like projections of this invention can have one set thereof projecting through the upper electrode and another set thereof projecting through the lower electrode, the two sets of needle-like projections either being in an aligned relation or being staggered relative to each other in any desired pattern.

Figure 14:
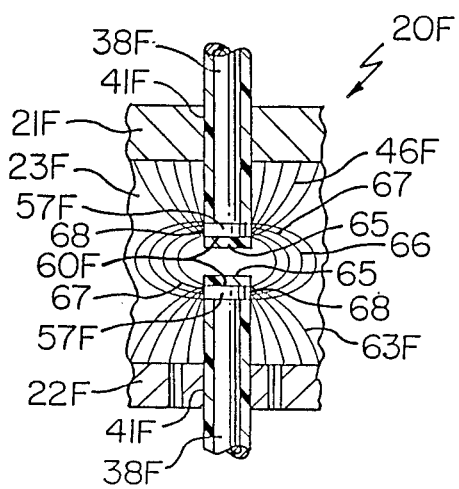
FIG. 14 is a view similar to FIG. 1 and illustrates another apparatus and method of this invention.

For example, another apparatus and method of this invention is generally indicated by the reference numeral 20F in FIG. 14 and parts thereof similar to the parts of the apparatus and methods 20–20E previously described are indicated by like reference numerals followed by the reference letter "F".

As illustrated in FIG. 14, the apparatus and method 20F has a plurality of needle-like electrodes 38F previously described and extending through cooperating opening means 41F in the upper electrode 21F. Similarly, a plurality of electrode means 38F extend through opening means 41F in the lower electrode 22F with the lower projections 38F being formed in a manner similar to the upper projections 38F.

In addition, each projection 38F has insulating means 65 disposed on the outer end surface 60F of the enlarged head 57F thereof.

While the projection means 38F of the apparatus and method 20F of this invention have the upper set and the lower set thereof disposed in axially aligned relation, it is to be understood that the same could be staggered relative to each other so that the lower set of projections 38F could extend all the way from the bottom electrode 22F to the upper electrode 21F and the upper projections 38F could extend all the way from the upper electrode 21F to the bottom electrode 22F as desired.

However, in the embodiment illustrated in FIG. 14 wherein the upper and lower projections 38F are disposed in axially aligned relation, it can be seen that when the projections 38F are respectively disposed within the liquid bearing material 23F between the electrodes 21F and 22F, the upper projections 38F can be charged with a potential that is opposite to the potential on the lower projections 38F so as to form a non-uniform field 66 between the enlarged heads 57F of the axially aligned projections 38F as illustrated in FIG. 14 wherein it can be seen that each non-uniform field 66 has the opposed intense portions 67 thereof respectively disposed adjacent the peripheral edges 68 of the respective enlarged heads 57F that are not covered by insulation means, such non-uniform field 66 acting on the liquid bearing material 23F between the electrodes 21F and 22F to tend to cause the liquid to move from the upper projection 38F to the lower projection 38F and the particles in the liquid bearing material 23F to move from the lower projection 38F to the upper projection 38F.

In addition, the upper projection 38F can be charged with a potential different than the potential charge on the upper electrode 21F to form the upper non-uniform field 46F for the purpose previously described. Likewise, the lower projection 38F can be charged with a potential that is different than the potential on the lower electrode 22F to form the lower non-uniform field 63F. For example, the upper electrode 21F can have a positive charge thereon while the upper projection 38F has a negative charge thereon. The lower electrode 22F can have a negative charge thereon and the lower projection 38F can have n positive charge thereon.

It is to be understood that during the operation of the apparatus and method 20F the upper and lower projections 38F can have the ends 65 thereof disposed flush with the facing surfaces 24F and 25F of the electrodes 21F and 22F so that the substantially uniform electrostatic field is created between the electrodes 21F and 22F thereafter the projections 38F can be moved inwardly to any desired degree into the material 23F and then moved outwardly relative to the material 23F as desired. For example, the two projections 38F illustrated can actually have the insulation means 65 thereof touching each other so that the projections 38F will move in unison with the intermediate electrostatic field 66 actually beginning just below the upper electrode 21F and then be caused to move downwardly to almost the bottom electrode 22F as desired. Also, it is to be understood that the spacing between the ends 65 of the projections 38F of the upper and lower projections 38F can be varied from a close spacing there 20 between to a wide space therebetween so as to cause the various fields 46F, 66 and 63F to operate in any desired manner on the material 23F.

While the method and apparatus 20F previously described has a plurality of upper projections 38F and a plurality of lower projections 38F, it is to be understood that the method and apparatus of this invention can have projections that always extend between both the upper and lower electrodes of the apparatus, if desired.

Figure 15:
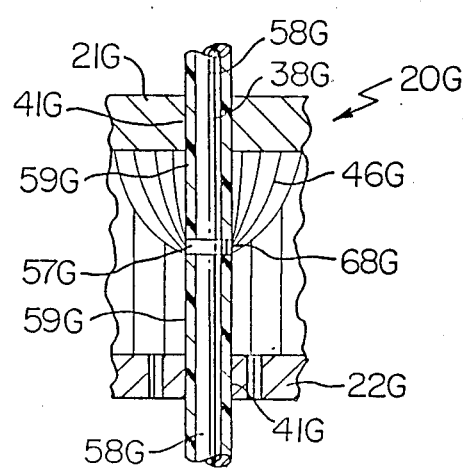
FIG. 15 is a view similar to FIG. 1 and illustrates another method and apparatus of this invention.

For example, another apparatus and method of this invention is generally indicated by the reference numeral 20G in FIG. 15 and parts thereof similar to the parts of the apparatus and methods 20–20F previously described are indicated by like reference numerals followed by the reference letter "G".

As illustrated in FIG. 15, a plurality of projections 38G are provided (only one such projection 38G being illustrated in FIG. 15) that respectively pass through aligned openings 41G in the upper electrode 21G and lower electrode 22G, each projection 38G comprising a body portion 58G and an enlarged disk-like intermediate portion 57G that has only its other peripheral edge 67G exposed as the remainder of the body portion 58G on opposite sides of the head 57G is covered by the insulating material 59G as previously described.

In this manner, each projection 38G can be provided with a charge that is opposite to the charge on the upper electrode 21G so as to form the upper non-uniform field 46G therewith with such non-uniform field 46G being caused to move from the upper electrode 21G down toward the bottom electrode 22G as the intermediate portion 57G of the projection 38G is moved downwardly. Of course, as the projection 38G is moved downwardly, the projection 38G can have the charge thereon changed so as to be opposite to the charge on the lower electrode 22G and thereby cause a field similar to the field 63 of FIG. 13 to now occur between the outer peripheral surface 68G of the enlarged head 57G and the lower electrode 22G as desired.

Therefore, it can be seen that in all of the various embodiments of the apparatus and method of this invention so far described, the projections are utilized to create non-uniform fields that will act on the liquid bearing material that is disposed between the normal or conventional electrodes so as to enhance the amount of dewatering and/or cake solidification as the case may be.

It is also to be understood that during the operation of the various apparatus and methods of this invention, the charging of the various electrodes and projections can be arranged so that the same will oscillate between the chargings thereof so that the resulting electrostatic fields will oscillate and thereby cause a dielectric heating of the liquid bearing material to a certain degree and then the oscillation of the fields can be terminated and the fields then being used to perform their dewatering function in the manner previously described, the heating of the liquid bearing material facilitating the dewatering thereof because of the lowering of the viscosity of the liquid through the heating thereof.

In fact, it may be found that the sonic or ultrasonic vibrating of the liquid bearing material through the non-uniform fields created by the projections of this invention will result in a dielectric heating of the liquid bearing material through just the action of the particles and liquid moving across the angled field lines created by the projections in much the same manner as fully set forth in the U.S. Patent to Candor, U.S. Pat. No. 4,404,754 whereby this patent is also being incorporated into this disclosure by this reference thereto.

It is to be understood that the projections of this invention can be uniformly arranged on their respective carrying plate or could be arranged in any desired pattern thereon. Also, the projections could have any desired lengths and diameters relative to each other or could be uniform relative to each other as desired.

In fact, while the projections of this invention have been described as "needle-like", it is to be understood that such term could apply to projections that are similar in size and shape to sewing needles or smaller or could apply to large knitting needles or larger as desired.

Also, it may be found that the vibration of the projections of this invention and/or the vibration of the liquid bearing material relative to the projections will not only enhance the dewatering operation as previously described, but also such vibration action may prevent the particles of the liquid bearing material from adhering to the projections and/or electrodes so as to enhance subsequent removal of the dewatered material from the apparatus of this invention.

For example, see FIG. 2A wherein it is believed that the vibration of the material 23 and/or projections 38 actually causes the cake material 23 to form in a spaced relation as indicated by the material free area 23' around the sides and ends 45 of the projections 38.

Also, while the projections of this invention have been illustrated and described as having a substantially circular transverse cross-sectional configuration, it is to be understood that the projections of this invention can have any desired transverse cross-sectional configuration and, in fact, can have a serrated, knife-like or rectangular configuration with the longitudinal axis of the projection extending parallel to the electrode carrying the same rather than transverse thereto as previously described. For example, see FIGS. 16-18 of the U.S. Patent to Candor et al, U.S. Pat. No. 3,633,282, whereby this patent is being incorporated into this disclosure by this reference thereto.

In all of the arrangements of this invention previously described, it is to be understood that the voltage between the upper and lower electrodes can be maintained substantially uniform throughout the entire dewatering operation or may vary throughout the entire dewatering operation. For example, the voltage between the two main electrodes can initially be any amount, such as 50 volts, and then as more and more liquid is removed, the voltage can be increased so that by the time the dewatering operation is ended, the voltage between the two main electrodes can be several thousand volts or more as desired. This is because the current flow, if any, between the main electrodes decreases as the liquid is being removed. Likewise, such uniform or varying voltage can be provided between the projections of this invention and their cooperating main electrode or electrodes.

It may be found that when dewatering with the main pair of electrodes, the removal of the liquid of the liquid bearing material by the uniform electrostatic field eventually produces a cake therefrom that prevents further dewatering thereof because the liquid remaining in the cake no longer is in electrical contact with at least one of the main electrodes. However, it is believed that by inserting the projections of this invention into such cake, further dewatering thereof will take place not only through the previously described non-uniform field action created thereby, but also by the fact that such charged electrodes will now be placed into electrical contact with the remaining liquid in the cake to provide an electrical current path therethrough which will occur between such projections and at least one of the electrodes that provide a potential differential therebetween as it may be found that it is best to always have some electrical current flow through the liquid bearing material to produce a liquid removing action therefrom.

In contrast, it may be found that it is desirable to completely electrically insulate the projections of this invention from the liquid material as well as to electrically insulate the main electrodes therefrom either by having the contacting surfaces of the main electrodes covered with electrically insulating material or having the same spaced from the liquid bearing material as fully illustrated and described in the aforementioned Patent to Candor, U.S. Pat. No. 4,236,317.

Therefore, it can be seen that the terms "electrostatic field" and "electric field" as used in this application are synonymous and are intended to describe a uniform or non-uniform field that is created through the liquid bearing material disposed between two members that have a potential differential imposed thereon whether those members are in electrical contact with the liquid bearing material or electrically insulated therefrom. Thus, it is believed that a higher voltage between such members must be utilized to remove liquid from the liquid bearing material when no electrical current is flowing between such members and through the liquid bearing material than the voltage utilized when electrical current is flowing between such members and through the liquid bearing material. However, it is realized that different liquid bearing materials have different conductivities and that some liquid bearing materials have substantially no conductivity whereby the voltage utilized for dewatering a particular liquid bearing material will be different than the voltage utilized for dewatering another type of liquid bearing material and that the voltage utilized will be different if the members are electrically insulated from a particular liquid bearing material than the voltage utilized if the members are in electrical contact with that particular liquid bearing material.

While it has been previously theorized that the various non-uniform fields of this invention tend to more solidly move the particles of the liquid bearing material closer together to enhance the dewatering operation, it may be found that, in lieu thereof or in addition thereto, a more beneficial effect of the non-uniform fields of this invention is to actually cause a migration of the liquid in the resulting cake toward the projection means of this invention as it is believed that liquid in capillaries or porous material tends to physically move in the direction of increasing field inhomogeneity to the capillary or pore mouth when an inhomogeneous electrostatic or electric field or non-uniform electrostatic or electric field is directed across that capillary or porous body. For example, see the article "Effect of a Corona Discharge Field On Evaporation of Liquid From Capillaries" by Karpovich et al, J. Eng. Phys., 1981, 41, 1333. In addition, see the article "Study of Electric Field-Induced Effects On Water Vapor Adsorption In Porous Adsorbents" by Someshwar et al, Ind. Eng. Chem. Fundam., 1985, 24, 215-220; the article "Effect Of An Electric Field On The Kinetics of Water Sorption By A Capillary-Porous Material" by Panchenko et al, J. Eng. Phys., 1972, 22, 554, and the article "Influence of Inhomogeneous Electric and Magnetic Fields on Internal Mass Transfer In Capillary-Porous Bodies" by Panasyuk et al, J. Eng. Phys., 1978, 35, 827, whereby these four articles are being incorporated into this disclosure by this reference thereto.

Therefore, it may be found that when utilizing the basic upper and lower electrodes 21 and 22 to provide a uniform field therebetween for initially dewatering the slurry 23 disposed therebetween by the aforementioned electrophoretic and electro-osmotic operation, the resulting cake that forms against the underside 24 of the upper electrode 21 may be so dewatered that the upper electrode 21 no longer makes electrical contact with the remaining liquid in the material 23 disposed between the electrodes 21 and 22 even after the remaining material has been vibrated in the manner previously described.

It is believed that by moving the projections 38, FIGS. 1 and 2, of this invention into the cake 23 below the surface 24 of the upper electrode 21, not only will the projections 38 be moved through the dewatered part of the cake adjacent the surface 24 of the upper electrode 21 so as to be placed into electrical contact with the liquid in the material 23 that is disposed below the surface 24 of the upper electrode 21 as previously set forth, but also it may be found that the non-uniform fields being created by the projections 38 with the lower electrode 22, as represented by the reference numeral 46 in FIG. 2, each has the field lines 50 thereof radiating toward the respective projection 38 so that such radiating lines 50 actually cause a migration of the liquid in the pores of the material 23 toward the projections 38 for the reasons set forth in the previously mentioned four articles so that when the migrating liquid reaches the projections 38 then the same provides electrical continuity between the projections 38 and the lower electrode 22 to further the dewatering operation by the aforementioned electro-osmotic operation previously set forth. In order to enhance the migration of the liquid by the non-uniform fields 46 converging toward the projections 38, the vibration of the material 23 in any of the manners previously set forth may reduce the surface tension in the capillaries or pores of the material 23 so as to further enhance the movement of the liquid in the pores or capillaries toward the projections 38 for the dewatering function of this invention as well as may form cracks or fissures in the cake material 23 to enhance the migration toward the projections 38.

Therefore, the operation of the method and apparatus of this invention illustrated in FIGS. 1 and 2 may occur as follows.

After the electrodes 21 and 22 have been utilized to form the uniform field therebetween to initially dewater the material 23 as previously set forth, in combination with or without the vibratory action, and the cake forming against the under surface 24 of the electrode 21 has now been dewatered sufficiently that electrical continuity is no longer provided by the liquid in the material 23 between the upper and lower electrodes 21 and 22, the projections 38 are initially moved downwardly so as to have the ends 45 thereof project below the surface 24 of the upper electrode 21 whereby it is believed that the same will now be placed in electrical contact with the liquid in the material 23 that is still below the electrode 21 so as to further dewater the material 23 between those projections 38 and the lower electrode 22. However, even at this point of the initial insertion of the projections 38, eventually the liquid adjacent the projections 38 will have been dewatered away from the same so that it is desired to have the water flow to the projections 38. This may be accomplished by the aforementioned non-uniform fields 46 acting on the cake material around the projections 38 to tend to cause migration of the liquid in the pores or capillaries of the cake toward the projections 38 and through the vibration of the cake material 23 the movement of the liquid will be enhanced toward the projections 38. However, it may be found that it is necessary to increase the voltage between the projections 38 and the lower electrode 22 at this time in order to assure the migration of the liquid by the non-uniform fields 46 toward the projections 38 as it is believed that the greater the voltage across the electrode 22 to the projections 38, the greater the strength of the non-uniform fields 46 in dewatering the material 23. Once the liquid reaches the projections 38 so as to provide electrical continuity between the projections 38 and the lower electrode 22 for the aforementioned electro-osmotic operation, then the voltage between the projections 38 and the lower electrode 22 may be decreased until it is desired to again try to migrate liquid toward the projections 38 either in the last inserted position thereof or after the same have been further progressively moved into the cake material 23 between the electrodes 21 and 22. Obviously, if vibration action is taking place when the projections 38 are being moved into the cake material 23, the vibrating action will reduce the force necessary to push the projections 38 into the cake 23.

Thus, it can be seen that the projections 38 may not only cause the particles of the cake material 23 to become more closely packed by the non-uniform fields 46 as previously described, but also the non-uniform fields 46 may then cause the liquid within the pores and capillaries of the dewatered cake to migrate toward the projections 38 through the converging field lines 50 thereof as previously set forth.

This non-uniform effect for moving the liquid that remains in the dewatered cake toward the projections of this invention is highlighted by the arrangement illustrated in FIGS. 6 and 7 of applicant's drawings wherein the upper non-uniform fields 55 being created between the upper electrode 21B and the projections 38B by having the upper electrode 21B charged oppositely to the projections 38B obviously have the field lines 56 thereof converging toward the projections 38B to provide non-uniform fields converging toward the projections 38B throughout the entire length thereof below the lower surface of the upper electrode 21B so that when the liquid reaches the projections 38B by the non-uniform field effect, the liquid will flow to the ends 45B of the projections 38B to be directed toward the lower electrode 21B by the lower fields 46B creating the electro-osmotic effect therebetween as previously set forth. And it can be seen that during the entire time the projections 38B are being moved downwardly into the material 23B, the upper non-uniform fields 55 are trying to direct liquid to the entire length of the respective projections 38B.

It is believed that if the material 23B and/or projections 38B are being vibrated during such time that the projections 38B are projecting into the material 38B, the liquid being drawn to the projections 38B by the respective non-uniform fields 55 will be received in the spaces created by the vibrating projections 38B and the cake of material 23B adjacent thereto, such as the space 23' of FIG. 2A previously described, and thereby flow to the ends of the projections 38B by gravity, etc. so as to provide an electrical path from the ends of the projections 38B through the liquid in the material 23B between the ends of the projections 38B and the lower electrode 22B. In fact, it might be found that the vibrating movement of the projections 38B and/or material 23B causes the projections 38B to, in effect, respectively and rapidly move back and forth in the spaces between the cake of material 23B and actually pump the liquid drawn into such spaces toward the ends of the projections 38B.

Therefore, it can be seen in all of the embodiments of this invention that because the non-uniform fields have the more intense portions thereof converge toward the projections that cooperate in forming those non-uniform fields, such non-uniform fields can be utilized for the purpose of causing the liquid remaining in the pores and capillaries of the material being dewatered by the apparatus and method of this invention to migrate toward those projections by the non-uniform field effect being enhanced by the vibration of the material which reduces the surface tension or capillary holding effect of the capillaries on that liquid so that the liquid is more readily drawn toward the projections by the non-uniform field effect previously set forth.

In fact, it may be found that it is desired to enhance the non-uniform field effect acting across the partially dewatered cake to cause the remaining moisture therein to migrate toward the projections of this invention.

Figures 16, 17, 18, 19, 20:
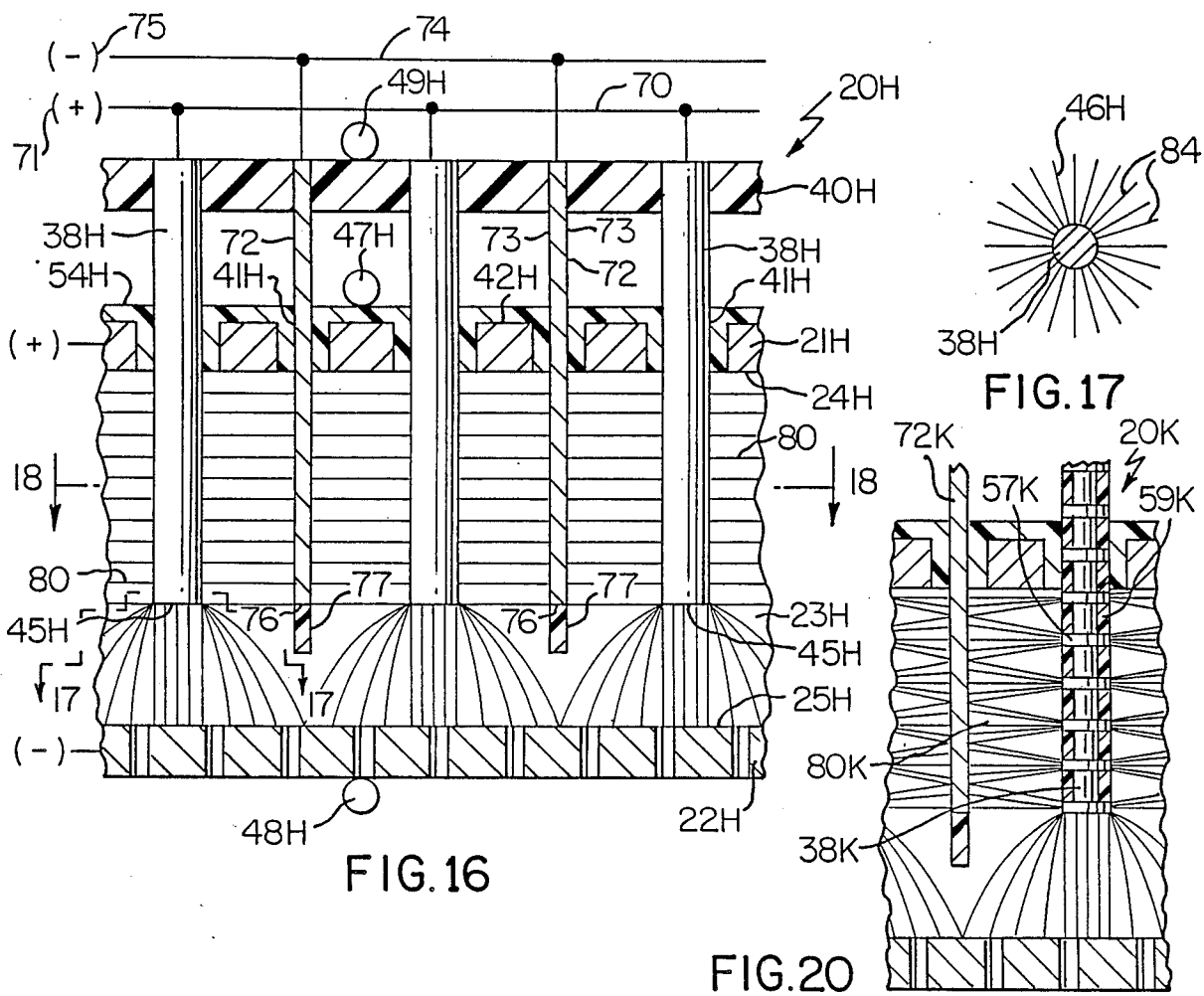
FIG. 16 is a view similar to FIG. 1 and illustrates another method and apparatus of this invention.
FIG. 17 is a fragmentary cross-sectional view taken on line 17—17 of FIG. 16 to illustrate the field lines of the non-uniform field being created by a particular projection of the method and apparatus of FIG. 16.
FIG. 18 is a fragmentary cross-sectional view taken on line 18—18 of FIG. 16.
FIG. 19 is a view similar to FIG. 18 and illustrates another embodiment of the method and apparatus of this invention.
FIG. 20 is a view similar to FIG. 1 and illustrates another method and apparatus of this invention.

One apparatus and method of this invention for further enhancing the non-uniform field effect is generally indicated by the reference numeral 20H in FIGS. 16–18 and parts of the method and apparatus 20H of this invention that are similar to the parts of the methods and apparatus previously set forth are indicated by like reference numerals followed by the reference letter "H".

As indicated in FIG. 16, the method and apparatus 20H of this invention includes the upper electrode means 21H and lower electrode means 22H with the material 23H being disposed therebetween in the manner previously set forth to be dewatered by the electrodes 21H and 22H being oppositely charged by any suitable means, such as by the electrode 21H having a positive charge imposed thereon and the lower electrode 22H having a negative charge imposed thereon.

The method and apparatus 20H of this invention includes a plurality of conductive cylindrical projections 38H being carried in spaced apart relation by a plate means 40H that is formed of electrically insulating material so that the projections 38H are completely electrically separated from each other by the plate means 40H but are electrically interconnected together by a lead means 70 to a charging means 71 which is adapted to charge the projections 38H with any desired potential, such as the positive potential illustrated.

In addition, the upper plate 40H carries a plurality of flat conductive projections or plates 72 which have opposed flat sides 73 respectively facing the projections 38H in the pattern illustrated in FIG. 18 so that it can be seen that each projection 38H has four sides 73 of four plates 72 facing the same, the upper electrode 21H having the opening means 41H formed therethrough in the same pattern and in the same configuration as the projections 38H and plates 72 so that the plates 72 and projections 38H can be moved through the openings 41H in unison by the plate 40H. The openings 41H and the upper surface 42H of the upper electrode 21H are lined with suitable electrically insulating means 54H in the same manner as the electrode 21B previously described.

The plates 72 are carried by the upper insulating plate 40H in such a manner that the same are adapted to be all electrically interconnected to a lead means 74 that is adapted to be charged by a suitable charging means 75 with any suitable charge, such as the negative charge as illustrated in FIG. 16.

While the plates 72 and projections 38H are so arranged on the insulating plate 40H so that the lower ends or surfaces 45H of the projections 38H are at the same level as the lower ends 76 of the plates 72, it is to be understood that the ends 45H of the projections 38H could be above or below the surfaces 76 of the plates 72, if desired.

In addition, it can be seen that the ends 76 of the plates 72 carry electrically insulating extensions 77 thereon so that the extensions 77 are adapted to abut against the upper surface 25H of the lower electrode 22H should the plate 40H be moved downwardly relative to the lower electrode 22H to a position wherein the extensions 77 abut the surface 25H so that it can be seen that the projections 38H in such a situation will still have the lower surfaces 45H thereof spaced above the surfaces 25H of the lower electrode 22H so as to prevent direct shorting therebetween. In addition, the extensions 77 could be of a length that spaces the bottoms 76 of the plates 72 from the surface 25H of the electrode 22H when the extensions 77 are against the surface 25H a distance that is greater than the distance that the sides 73 of the plates 72 are spaced from their cooperating projections 38H for a purpose hereinafter set forth.

While the method and apparatus 20H illustrated in FIG. 16 is not shown to have the evacuating means 32 previously described, it is to be understood that the same can have such evacuation means 32 as illustrated in FIG. 1 utilized therewith and that the plates 40H, 21H and 22H can be vibrated by the respective means 49H, 47H and 48H as previously described, if desired.

The operation of the method and apparatus 20H of this invention will now be described.

When the material 23H is initially introduced between the upper and lower electrodes 21H and 22H, the plate 0H can be in a raised condition so that the ends 45H of the projections 38H are substantially flush with the lower surface 4H of the upper electrode 21H so that only a uniform field will be created between the electrodes 21H and 22H during the initial dewatering operation on the material 23H as previously set forth.

However, after the formation of a cake against the surface 24H so that the retained liquid in such cake is no longer in electrical contact with the electrode 21H or even if the same is in electrical contact but the dewatering operation is slowed down, the plate 40H is moved downwardly so that the projections 38H and plates 72 are moved into the material 23H to a desired degree. At this time, the plates 72 and projections 38H are oppositely charged with the projections 38H having an opposite charge to the lower electrode 22H. Since the plates 72 are oppositely charged relative to the projections 38H, non-uniform fields 80 are created with the projections 38H as illustrated in FIG. 18 with each field 80 having its more intense portion 81 of its field lines 82 converging toward the projections 38H and away from the facing sides 73 of the plates 72.

In this manner, it is believed that relatively strong non-uniform electrostatic or electric fields can be created between the plates 72 and projections 38H by creating a relatively large voltage between the plates 72 and the projections 38H while a normal low voltage is maintained between the projections 38H and the lower electrodes 22H so that the liquid remaining in the cake material 23H between the projections 38H and the plates 72 will be caused to migrate toward the projections 38H and run down the projections 38H or be moved toward the ends 45H thereof and be directed toward the lower electrode 22H by the aforementioned electro-osmotic action. Of course, if a vibratory action is also being imposed at this time, the migration of the liquid toward the projections 38H as well as the dewatering operation between the projections 38H and the bottom electrode plate 22H will be enhanced as previously set forth.

Thus, as the projections 38H and plates 72 are projected further downwardly into the material 23H, a greater surface area of the plates 72 and projections 38H have the non-uniform fields acting therebetween for dewatering purposes and, of course, the vibration of the material 23H will enhance the migration of that retained liquid toward the projections 38H for the reasons previously set forth. Accordingly, it can be seen that the cake material 23H adjacent the upper electrode 21H continuously has the non-uniform fields 80 acting thereon the entire time the projections 38H and 72 are being moved toward the lower electrode 22H so that it is believed that the drier part of the cake material 23H will be subjected to the non-uniform field effect for a longer period of time than the more wet portions thereof.

Eventually, the plates 72 can have the insulating extensions 77 thereof abut against the surface 25H of the lower electrode 22H so as to prevent further insertion of the projections 38H into the material 23H. Since the length of the extensions 77 can be longer than the distance of a side 73 of a plate 72 relative to its associated projection 38H, no field effect will be created between the plates 72 and the bottom electrode 22H. However, by using a different length for the extensions 77, this could be different.

Therefore, it can be seen that the voltage between the side 73 of each plate 72 and its associated projection means 38H can be several thousand volts whereas the voltage between that projection 38H and the lower electrode 22H could be only 50 volts, if desired. Of course, it is to be understood that the voltage between the plates 72, projections 38H and the projections 38H and the electrode 22H can be any desired voltage or any desired changing voltage as desired.

While the plates 72 have been illustrated as having flat sides 73, it is to be understood that the plates 72 can have the sides 73 thereof of any desired configuration.

For example, reference is now made to FIG. 19 wherein it can be seen that the plates 72J have the sides 73J thereof defined on arcs that would describe a complete circle 83 about a particular projection 38J as illustrated.

Therefore, this invention is not to be limited to any shape of the plates 72 that cooperate with the projections 38H in forming the non-uniform fields 8 for the reasons previously set forth.

In regard to the lower non-uniform fields 46H being formed between the projections 38H and the lower electrode 22H, it can be seen from FIG. 17 that the field lines 84 radiate through the material 23H toward the particular projection 38H to also tend to move the retained liquid in the material 23H toward that projection 38H while the field lines that are between the end 45H of that projection 38H and the upper surface 25H of the lower electrode 22H are merely substantially vertical and therefore uniform between the ends 45H and a like circle area on the surface 25H of the lower electrode 22H for the electro-osmotic function previously set forth.

Therefore, it can be seen that while the various projections of this invention take up a relatively small area or volume of the total area or volume between the upper and lower electrodes, the projections reach out through the non-uniform field effect thereof so as to tend to pull from a large area or volume of the retained liquid in the liquid bearing material toward those projections when those projections are being utilized to form non-uniform fields in the various manners previously set forth.

Of course, after a dewatering operation with the apparatus and method 20H of FIG. 16, the plate 40H is moved upwardly so as to remove the projections 38H and plates 72 from between the electrodes 21H and 22H with the electrode 21H stripping any material sticking to the projections 38H and plates 72 as the projections 38H and plates 72 move up through their cooperating openings 41H of the electrode 21H as previously set forth.

It is also to be understood that the operation of the method and apparatus 20H of FIG. 16 can have the projections 38H and plates 72 start in their completely down position or in any other degree of projection into the material 23H rather than wait until after a dewatering 35 operation by the electrodes 21H and 22H. Also, the plates 72 and projections 38H could be extended up through the bottom electrode 22H rather than through the upper electrode 21H or could project separately from opposite electrodes and directions as desired.

Also, it is to be understood that the plates 72 of this invention as previously described could be complete cylinders of electrically conductive material that completely surrounds a projection 38H in a concentric manner therewith, if desired.

Of course, it is to be understood that all of the projections 38H and 72 can be of the same size and shape so as to merely create electrostatic fields therebetween whether such fields are uniform or non-uniform as desired as an important feature of this invention is to create a field between projections that enhances the dewatering effect of at least one of those projections with the regular electrodes of the dewatering apparatus and method.

In addition, it might be found that it is best to start the dewatering operation of the method and apparatus 30H with the projections 38H and plates 72 in their completely down position relative to the lower electrode 22H so that the non-uniform fields 80 between the plates 72 and projections 38H will cause a migration of the particles of the material 23H toward the projections 38H by electrophoresis, as well as by dielectrophoresis, and liquid toward the plates 72 by electro-osmosis. The articles when reaching the projections 38H may then be drawn upwardly toward the upper electrode 21H by the normal electrophoretic action caused by the electrodes 21H and 22H and the liquid when reaching the plates 72 may then be drawn downwardly toward the lower electrode 22H by the normal electro-osmotic action caused by the electrodes 21H and 22H. Thus, after a sufficient cake of the particles of the liquid bearing material 23H has formed against the upper electrode 21H, or before, the projections 38H and plates 72 can be moved upwardly to a desired up position thereof and then be progressively moved downwardly as previously set forth to dewater the cake between the plates 72 and projections 38H in the manner previously described wherein the non-uniform fields 80 cause the remaining liquid in the cake to now move toward the projections 38H as capillaries or pores have now been formed by the particles forming the cake therebetween.

In the operation of the method and apparatus 20H previously described, it may be found that when it is desired to dewater the cake that has formed between the projections 72 and 38H after each movement of the projections 72 and 38H toward the lower electrode 22H takes place, the plates 72 should be first charged with a potential that is the same potential to which the upper electrode 21H had been charged while charging the projections 38H to the same potential to which the lower electrode 22H had been charged to tend to cause the particles of the cake 23H to move toward the plates 72 by electrophoresis for the same reasons that the particles initially tended to move toward the upper electrode 21H and to tend to cause the liquid of the cake 23H between the plates 72 and projections 38H to move toward the projections 38H not only for the same reason that the liquid initially tended to move by electro-osmosis toward the lower electrode 22H, but also because of the aforementioned non-uniform field pulling or pushing effect of the fields 80. Thereafter, the potential on the projections 38H and plates 72 can be reversed so that plates 72 have the same potential as the lower electrode 22H and the projections 38H have the same potential as the upper electrode 21H not only to tend to cause the liquid that had been drawn toward the projections 38H to now migrate toward the lower electrode 22H by electro-osmosis, but also to tend to further dewater the cake 23H between the plates 72 and projections 38H by the non-uniform field effect thereon for the reasons previously set forth. Of course, the vibratory action can be imposed during the entire time or any desired part or parts of the time that the projections 38H and 72 are being used. Also the electrodes 21H and 22H can be charged during all, some or none of the time that the projections 72 and 38H are being used, as desired.

Referring now to FIGS. 18 and 19, it can be seen that the closer the plates 72 or 72J come to completing a square, the greater the amount of area of the non-uniform fields 80 will cover between such plates 72 and 72J and their respective projections 38H and 38J. Also, it is to be understood that additional projections 38H and 38J could be disposed between the adjacent four corners defined by the plates 72 and 72J to form non-uniform fields therewith (such as disposing a projection 38J where the reference number 83 is located in FIG. 19 or where the lower left reference number 80 is located in FIG. 18).

In this manner, substantially the entire area between the plates and projections will have a non-uniform field acting therethrough with the closeness of the plates and projections being governed by the strength of the electrode 21H in having the cooperating openings 41H being relatively close to each other.

Thus, it is believed that the projections 38H will act as a pump means to pump the liquid away from the ends or mouths of the capillaries or pores in the cake material 23H that are adjacent the projections 38H and direct the thus removed liquid toward the lower electrode 22H by electro-osmosis whereby the liquid in the capillaries or pores will continue to be moved toward the projections 38H by the non-uniform fields 80 as previously set forth to be subsequently pumped away therefrom as previously set forth.

Accordingly, it can be seen that it is believed that this invention of FIGS. 16–19 will use two field effects to enhance the dewatering operation of the upper and lower electrodes 21H and 22H, one field effect being between adjacent projections 38H and 72 and the other field effect being between the projections 38H and the lower electrode 22H. Such two field effects can take effect in unison or in series, be continuous or intermittent, etc. as desired. Also, the voltage for creating the two field effects can be the same or different as previously set forth as well as be oscillated as previously set forth.

While the non-uniformity of the fields 80 of FIGS. 16, 18 and 19 is in a radial direction relative to the projections 38H and 38J, it is to be understood that a non-uniformity of the fields 80 could also be in a vertical direction in FIG. 16 if the projections 38H are each provided with spaced annular bands or spaced circles of points that project outwardly therefrom in a radial direction, such as illustrated in FIGS. 10 and 11 of the aforementioned patent to King, U.S. Pat. No. 4,341,617.

Such an arrangement of this invention is illustrated in FIG. 20 wherein another method and apparatus of this invention is generally indicated by the reference numeral 20K and parts thereof that are similar to parts of the method and apparatus 20–20J previously described are indicated by like reference numerals followed by the reference letter "K".

As illustrated in FIG. 20 the method and apparatus 20K is substantially identical to the method and apparatus 20H of FIGS. 16 and 18 except that each projection 38K has a plurality of radially outwardly extending annular conductive bands 57K separated from each other by annular rings of insulating material 59K as in FIG. 15 so that the resulting electrostatic fields 80K created between each projection 38K and its cooperating plates 72K are in the non-uniform vertical arrangement illustrated in FIG. 20 as well as in the non-uniform horizontal arrangement as illustrated in FIG. 18.

While the various embodiments of this invention as previously set forth each has the projections of this invention being adapted to respectively project through cooperating opening means in one of the electrodes so that those projections will extend from one side thereof into the liquid bearing material to have the liquid thereof acted upon thereby, it is to be understood that each of the projections of this invention could actually be carried by its respective electrode in a manner to project from one side thereof to different positions relative to the material between the electrodes and relative to that one electrode without passing through opening means of that one electrode. For example, each projection could be hinged to that one side of that one electrode and have suitable actuator means to cause that projection to project to different positions thereof relative to the material between the electrodes and relative to that one electrode. Alternately, each electrode could be arranged to be expandable from that one side of that one electrode so as to project to different positions thereof relative to the material between the electrodes and relative to that one electrode.

Figures 21, 22:
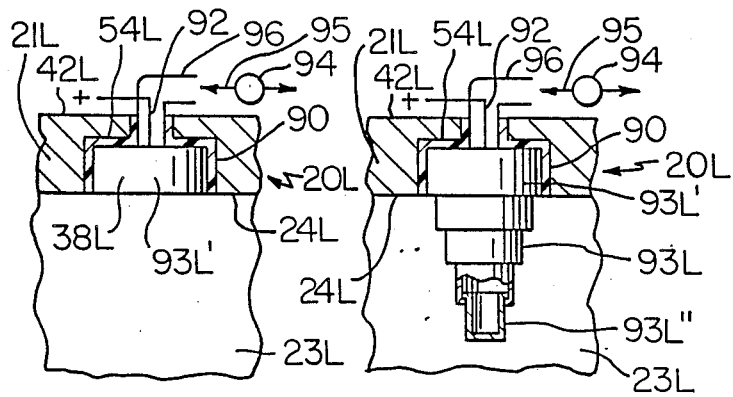
FIG. 21 is a view similar to FIG. 1 and illustrates another method and apparatus of this invention.
FIG. 22 is a view similar to FIG. 21 and illustrates the projection of one of the electrodes in an extended position thereof.

In particular, reference is now made to FIGS. 21 and 22 wherein another method and apparatus of this invention is generally indicated by the reference numeral 20L and parts thereof that are similar to the other methods and apparatus 20A–20K of this invention are indicated by like reference numerals followed by the reference letter "L".

As illustrated in FIGS. 21 and 22, the method and apparatus 20L of this invention includes the upper electrode plate 21L having the side 24L thereof disposed against the liquid bearing material 23L disposed between that upper electrode 21L and the lower electrode (not shown), such as the lower electrode 22 of FIG. 1.

The upper electrode 21L has a stepped opening 90 passing through the upper surface 42L thereof and the lower surface 24L thereof in such a manner to define an annular shoulder 91 intermediate the upper surface 42L and the lower surface 24L as illustrated. The stepped opening 91 is lined with a suitable electrically insulating material, such as the material 54L as illustrated, so as to electrically insulate a conductive projection 38L from the electrode plate 21L, the projection 38L being adapted to be interconnected to a suitable electrical power source to have a charge imposed thereon by a lead means 92 in the manner previously described whereby the projection 38L is adapted to be charged with the same charge, a different charge, etc. than the electrode plate 21L for the reasons previously set forth.

The projection 38L comprises a plurality of tubular sections 93L arranged to telescope together in a manner so as to be all disposed within the larger tubular section 93L' as illustrated in FIG. 21 and thereby be disposed substantially flush with the lower surface 24L of the electrode plate 21L. However, the tubular sections 93L are adapted to be untelescoped from each other so that the smallest tubular section 93L" is adapted to project into the material 23L various distances from the surface 24L of the electrode 21L depending upon the degree of untelescoping of the sections 93L.

For example, the sections 93L are adapted to be untelescoped from each other by having a fluid pressure directed to the interior of the telescoping sections 93L by a suitable pump means 94 having an outlet 95 thereof interconnected to a conduit means 96 that leads to the interior of the sections 93L. When it is desired to untelescope the sections 93L so as to completely collapse the projections 38L into the larger section 93L' thereof as illustrated in FIG. 21, the pump 94 can be reversed so that the same creates a vacuum in the conduit 96 to thereby cause the sections 93L to retract under the oppositely directed pressure differential being created across the same. Alternately, the smallest tubular section 93L" of the projection 38L could be interconnected to the larger section 93L' by a tension spring (not shown) which would retract the tubular sections 93L within the larger section 93L' when the air pressure being directed to the interior of the stack 93L was terminated and vented by the pump 94.

In any event, it can be seen that the method and apparatus 20L of FIGS. 21 and 22 permit the projection 38L to be moved from various positions thereof so as to project beyond the surface 24L of the electrode 21L into the material 23L to different positions relative to that material between the electrodes and relative to that one electrode 21L without first passing through an opening means of that electrode 21L as in the other embodiments of this invention, the projection 38L being used in the manner previously set forth to assist in the liquid removing operation of the apparatus 20L.

Therefore, it is to be understood that one or more of the projections in each of the embodiments of this invention previously set forth could be of the type illustrated in FIGS. 21 and 22 to function in the manner previously set forth.

For example, when viewing the embodiment 20H illustrated in FIG. 16, both projections 38H and 72 thereof could be of the telescoping type 38L so as to be carried by the upper electrode 21H and not project through respective opening means thereof but merely being contained within the electrode 21H itself to be expanded from the side 24H thereof in an untelescoping manner and creating not only the electric fields with the electrodes 21H and 22, but also creating the electric fields 80 therebetween.

It is to be understood that the projection 38L has cooperating inwardly and outwardly directed annular flanges on adjacent ends of the sections 93L thereof to permit the telescoping relation thereof and to prevent the sections 93L from coming apart when the projection 38L is fully extended, such flange structure being fully illustrated in FIG. 22 and being well known in the telescoping art.

As previously stated, any of the previously described embodiments of the apparatus and method of this invention can comprise a continuous dewatering arrangement wherein the electrodes can comprise movable endless belt means for continuously dewatering the material disposed therebetween and wherein either the upper belt means and/or the lower belt means can be provided with projections that would extend therefrom into the material being disposed therebetween to enhance the dewatering thereof in any of the manners previously set forth.

For example, one such apparatus and method of this invention is generally indicated by the reference numeral 20M in FIGS. 23–26 and parts thereof similar to the apparatus and methods 20–20L previously described will be indicated by like reference numerals followed by the reference letter "M".

Referring now to FIGS. 23–26, the apparatus and method 20M of this invention has the metallic electrode 21M formed into a continuous or endless belt means that is adapted to be driven by suitable drive roller means 100 located at the opposed side edges of the belt means 21M and driving the same in its continuous looped path by any suitable interconnecting driving arrangement, such as by having the rollers 100 provided with pinion gears on the outer periphery thereof and meshing with suitable rack-like openings on the respective side edges of the belt means 21M to positively drive the belt means 21M in a continuous manner so that a lower run 101 of the belt means 21M will continuously move from left to right in FIG. 23.

Similarly, the lower metallic electrode 22M is formed as a continuous or endless belt means that is trained around suitable drive roller means 102 located at the opposed side edges thereof and being disposed in driving relation with the belt means 22M so as to continuously move an upper run 103 thereof in substantially a horizontal manner from left to right in FIG. 23 so as to cooperate with the lower run 101 of the upper electrode means 21M to define a chamber 104 therebetween that is adapted to receive the liquid bearing material 23M therein, the material 23M being adapted to flow between the belt runs 101 and 103 at an entrance or inlet end 105 of the apparatus 20M and be discharged at an exit or outlet end 106 of the apparatus 20M as illustrated in FIG. 23.

The apparatus 20M will perform an electro-dewatering operation on the material 23M as the same passes from left to right through the apparatus 20M so that the material 20M exiting from the outlet end 106 of the apparatus 20M is in a drier condition than the material 23M that enters the inlet end 105 thereof as will be apparent hereinafter.

Another metallic belt means 107 is provided for the apparatus 20M and the same is disposed in an endless or looped manner inside the looped belt means 21M about drive rollers 108 which are located at the opposed side edges of the belt 107 and are disposed in driving relation therewith so as to drive the belt means 107 in such a manner that the lower run 109 thereof moves in spaced relation to the run 101 of the belt means 21M and from left to right in FIG. 23 as will be apparent hereinafter.

While the drive rollers 100, 102 and 108 are illustrated in FIG. 23 as being only at one side edge of the belts 21M, 22M and 107, it is to be understood that there will be a like set of rollers 100, 102 and 108 at the other side edge thereof.

The apparatus 20M has a plurality of transversely disposed support rollers 110 arranged in the pattern illustrated in FIG. 23 to support the lower belt means 22M in its looped travel as well as to permit the material 23M to be compressed between the runs 101 and 103 of the belts 21M and 22M in a manner well known in the art. Similarly, a plurality of transversely disposed support rollers 111 are provided for the apparatus 20M to support the looped travel of the inner belt means 107 (as well as the outer belt means 21M as will be apparent hereinafter) with the lower support rollers 111 being particularly adapted to accomplish the compressing action on the material 23M between the runs 101 and 103 of the belts 20M and 22M in a manner well known in the art as the drive rollers 100 and 108 as well as the support rollers 111 can be caused to move toward the lower belt means 22M to compensate for the liquid being removed from the material 23M as the material 23M moves from left to right through the apparatus 23 all in a manner well known in the art.

For example, such means is fully set forth in the aforementioned U.S. patent to Candor, U.S. Pat. No. 4,236,317 and the aforementioned U.S. patent to Moeglich, U.S. Pat. No. 4,244,804, as well as in the U.S. patent to Pepping, U.S. Pat. No. 4,101,400, the U.S. patent to Fremont et al, U.S. Pat. No. 4,671,874 and the U.S. patent to Kunkle et al, U.S. Pat. No. 4,680,104 whereby these last three U.S. patents are also being incorporated into this disclosure by this reference thereto.

The outer electrode belt means 21M carries a plurality of projection units of this invention that are each generally indicated by the reference numeral 112 and each unit 112 comprises a cylindrical metallic projection 38M and a tubular metallic housing means 113 with the tubular housing means 113 having a stepped end 114 disposed in a cooperating opening 115 formed through the belt means 21M so that the stepped end 114 can be secured therein, such as by welding, and have an annular shoulder 116 abutting against the surface 42M of the belt means 21M as illustrated in FIGS. 24–26 so that a surface 117 of the tubular housing 113 that fully projects through the opening 115 is disposed substantially flush with the surface 24M of the electrode 21M as illustrated in FIG. 24.

The cylindrical projection 38M of each unit 112 has its flat end surface 45M adapted to be disposed flush with the housing end surface 117 and the surface 24M of the electrode 21M when the projection 38M is held in its fully up position as illustrated in FIG. 24 by a suitable compression spring 118 having one end 119 bearing against the surface 42M of the electrode 21M and its other end 120 bearing against a surface 121 of a metallic disc-like member 122 fastened to the other end 123 of the projection 38M as illustrated.

In order to limit the amount of upper movement of the projection 38M of each unit 112 relative to its housing 113, the projection 38M can have a cross pin 124 that extends through a side slot 125 in its respective housing means 113 and having opposed ends 126 and 127 which respectively limit the upper movement of the projection 38M as illustrated in FIG. 24 by the pin 124 reaching the end 126 of the slot 125 and limiting the degree of projection of the projection 38M beyond the surface 24M of the electrode 21M in the manner illustrated in FIG. 26 by the cross pin 124 bottoming out against the end 127 of the slot 125 as illustrated. Of course, it is to be understood that the amount of projection of the projection 38M below the surface 24M of the electrode 21M could be limited by the surface 121 of the disc-like member 122 of the projection 38M bottoming out against the upper surface 128 of the respective housing means 113 before the pin 124 hits the bottom 127 of the slot 125 as the case may be.

In any event, each projection unit 112 has an upper cam surface 129 on the disc-like member 122 which will bear against the outside surface 130 of the inner belt 107 that is not secured thereto so that a differential movement between the belts 107 and 21M can be provided even though the inner belt 107 tends to control the degree of projection of the projections 38M into the material 23M as the particular projection unit 112 moves from left to right in FIG. 23 at the lower run 101 of the electrode belt 21M as will be apparent hereinafter.

The belts 21M and 22M can be oppositely charged as previously described and the projections 38M will be given the same charge as the belt 21M as the housings 113 are conductive. However, the housings 113 could be made of insulating material and the springs 118 could be insulated so that the projections 38M can be given a charge different than the charge on the belt 21M, if desired.

The belt 21M can carry the projection units 112 in any suitable pattern thereon and in any suitable spacing therebetween with the units 112 being arranged in longitudinal rows and transverse rows or in staggered longitudinal rows and staggered transverse rows as desired. For example, see FIG. 8 of the aforementioned U.S. patent to Candor, U.S. Pat. No. 4,236,317, wherein projections on an electrode sheet are arranged in both transverse and longitudinal directions to provide a desired pattern thereof.

In any event, it can be seen that the apparatus 20M of this invention can be formed from relatively simple parts to operate in a manner now to be described.

As the belt means 21M and 22M, as well as the inner belt 107, are being driven by their respective drive rollers 100, 102 and 108 so that the runs 101, 103 and 109 move from left to right in FIG. 23, the material 23M being continuously fed into the chamber 104 at the inlet end 105 of the apparatus 20M is moved from left to right to be discharged at the outlet end 106 with the liquid thereof having been removed not only by the electrostatic field 28M created between the electrodes 21M and 22M in the manner previously set forth, but also by the projections 38M each moving from the inlet end 105 to the outlet end 106 and being progressively projected into the material 23M to create the non-uniform fields 46M as illustrated in FIGS. 25 and 26 and as previously set forth, the support rollers 110 and 111 being so controlled in the spacing therebetween in the apparatus 20M that each projection unit 112 has its projection 38M in its fully up position as illustrated in FIG. 24 adjacent the inlet end 105 of the apparatus 20M and then being at its fully inserted position into the material 23M as illustrated in FIG. 26 at the outlet end 106 of the apparatus 20M.

In this manner, it can be seen that the spacing between the support rollers 110 and 111 at the entrance end 105 of the apparatus 20M are arranged to be approximately the distance A from each other as illustrated in FIG. 26 and by the time that particular projection unit 112 is at the position 26—26 of FIG. 23, the support rollers 110 and 111 at the position 26—26 are disposed at the distance B from each other. Likewise, the compression springs 118 of the units 112 thereby tend to provide a compressive force on the material 23M between the runs 101 and 103 of the electrode belts 21M and 22M to express liquid therefrom through the openings 26M of the belt means 22M and also take up the volume between the runs 101 and 103 as the liquid of the material 23M is being removed therefrom as is evidenced by the runs 101 and 103 at the entrance end 105 of the apparatus 20M being disposed initially at the spacing C of FIG. 26 and ending up with the spacing D at the time the particular projection unit 112 is at the position 26—26 of FIG. 23.

Therefore, it can be seen that by computer controlling the up and down movement of the right—hand end of the upper belt means 21M and 107 of the apparatus 20M, the degree of projection of the projections 38M into the material 23M as the projections 38M progress from left to right through the apparatus 23 can be controlled as well as the degree of compression of the material 23 between the belts 21M and 22M as desired.

In any event, it can be seen that the apparatus 20M will dewater the material 23M through the action of the electrostatic field created between the electrodes 21M and 22M as well as by the electrostatic fields being created by the projections 38M all for the same reasons as set forth with regard to the embodiment 20 of applicant's invention as previously set forth.

Of course, it is to be understood that during the movement of the projection units 112 from left to right in FIG. 23, the material 23M being acted upon by the particular projection unit 112 can be sonically or ultrasonically vibrated to enhance the dewatering operation as previously set forth. For example, the support rollers 111 and/or support rollers 110 could be sonically or ultrasonically vibrated to transmit the vibratory energy to the material 23M disposed between the electrode belts 21M and 22M for the reasons previously set forth in regards to the vibrating units 47, 49 and 48 of FIG. 1.

While the runs 101 and 103 of the belts 21M and 22M can be driven at the same speed, the belts 21M and 22M can have the runs 101 and 103 driven at different speeds so that not only will such differential movement cause a turbulence to the material 23M as it moves from left to right in FIG. 23, but also the projections 38M will cause a raking action on the material 23M as the material 23M is passed from left to right through the apparatus.

Also, while the runs 101 and 103 of the belts 21M and 22M are illustrated as being in direct electrical contact with the material 23M so that an electrical current can flow through the material 23, it is to be understood that the belts 21M and 22M and/or the projections 23M can be insulated from the material 23M, if desired.

Therefore, it can be seen that any of the electrode embodiments of applicant's invention that are generally indicated by the reference numerals 20–20L could be utilized to form a continuous dewatering arrangement such as illustrated in FIGS. 23-26.

For example, as previously stated, the projections 38M can be given a potential or charge different than the potential or charge of the belt 21M by forming the housings 113 of electrically insulating material and electrically insulating the springs 118. For example, the belt 107 can be given the desired different potential or charge and the belt 107 will then impose that different potential or charge to the projections 38M in the run 101 of the belt 21M as the heads 122 thereof are in good electrical contact with the run 109 of the belt 107 under the compressive force of the springs 118 whereby the apparatus 20M will dewater in the same manner as the apparatus 20B as previously described.

It is to be understood that while the terms "dewater," etc., have been previously used, it is intended that the "liquid" of the liquid bearing material to be removed by the various apparatus and methods of this invention can be any suitable aqueous or nonaqueous liquid or even mixtures thereof, if desired.

Therefore, it can be seen that this invention not only provides a new apparatus for removing liquid from liquid bearing material and the like, but also this invention provides a new method for removing liquid from liquid bearing material or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an apparatus for removing liquid from liquid bearing material and comprising a pair of spaced apart electrodes for being disposed on opposite sides of said material, means for creating an electrostatic field between said electrodes for acting through said material to remove liquid from said material, and a projection extending from one of said electrodes so as to be disposed in said material between said electrodes to assist in removing liquid from said liquid bearing material, said electrodes comprising a pair of movable endless belts having adjacent runs thereof adapted to move in the same direction with said material disposed therebetween so as to move in the same direction therewith, the improvement wherein said apparatus has means to project said projection from said one electrode to different positions thereof relative to said material between said electrodes and relative to said one electrode at least some time during the time that said material is disposed between said electrodes.

2. An apparatus as set forth in claim 1 and including means for creating a non-uniform electrostatic field between said projection and at least one of said electrodes.

3. An apparatus as set forth in claim 1 and comprising means to move said belts so that said adjacent runs move in said same direction but at different speeds relative to each other.

4. An apparatus as set forth in claim 1 and including means for electrically insulating said projection form said one electrode that has said projection projecting therefrom.

5. An apparatus as set forth in claim 4 and including means for charging said projection with a charge different than the potential of said one electrode.

6. An apparatus as set forth in claim 1 and comprising means for vibrating said liquid bearing material between said electrodes to assist in the removal of said liquid from said liquid bearing material.

7. An apparatus as set forth in claim 1 wherein said electrodes are adapted to be in electrical contact with said material so that an electrical current is adapted to flow through said material from one of said electrodes to the other of said electrodes while said electrostatic field is being maintained between said electrodes to act on said material.

8. An apparatus as set forth in claim 7 wherein said projection is also adapted to be in electrical contact with said material.

9. In a method for removing liquid from liquid bearing material and comprising the steps of providing a pair of movable endless belts having adjacent runs that comprises a pair of spaced apart electrodes so as to be disposed on opposite sides of said material, moving said belts so that adjacent runs move in the same direction, disposing said material between said electrodes to move in the same direction therewith, creating an electrostatic field between said electrodes so as to act through said material to remove liquid from said material, and disposing a projection from one of said electrodes so as to be disposed in said material between said electrodes to assist in removing liquid from said liquid bearing material, the improvement comprising the step of projecting said projection from said one electrode to different positions thereof relative to said material between said electrodes and relative to said one electrode at least some time during the time that said material is disposed between said electrodes.

10. A method as set forth in claim 9 and including the step of creating a non-uniform electrostatic field between said projection and at least one of said electrodes so as to act on said material.

11. A method as set forth in claim 9 wherein said step of moving said belts causes said adjacent runs to move in said same direction but at different speeds relative to each other.

12. A method as set forth in claim 9 and including the step of electrically insulating said projection from said one electrodes that has said projection projecting therefrom.

13. A method as set forth in claim 12 wherein said the step of charging said projection with a charge different than the potential of said one electrode.

14. A method as set forth in claim 9 and comprising the step of vibrating said liquid bearing material between said electrodes to assist in the removal of said liquid from said liquid bearing material.

15. A method as set forth in claim 9 and including the disposing said electrodes so that the same are in electrical contact with said material so that an electrical current flows through said material from one of said electrodes to the other of said electrodes while said electrostatic field is being maintained between said electrodes and is acting on said material.

16. A method as set forth in claim 15 and including the step of disposing said projection so that the same is also in electrical contact with said material.

17. In an apparatus for removing liquid from liquid bearing material and comprising a pair of spaced apart electrodes for being disposed on opposite sides of said material, means for creating an electrostatic field between said electrodes for acting through said material to remove liquid form said material, and a projection extending from one of electrodes so as to be disposed in said material between said electrodes to assist in removing liquid from said liquid bearing material, the improvement wherein said apparatus has means to project said projection from said one electrode to different positions thereof relative to said material between said electrodes and relative to said one electrode at least some time during the time that said material is disposed between said electrodes.

18. An apparatus as set forth in claim 17 and including means for creating a non-uniform electrostatic field between said projection and at least one of said electrodes.

19. An apparatus as set forth in claim 17 and including means for electrically insulating said projection from said one electrode that has said projection projecting therefrom.

20. An apparatus as set forth in claim 17 wherein said electrodes are adapted to be in electrical contact with said material so that an electrical current is adapted to flow through said material from one said electrodes to the other of said electrodes while said electrostatic field is being maintained between said electrodes to act on said material.

21. An apparatus as set forth in claim 20 wherein said projection is also adapted to be in electrical contact with said material.

22. An apparatus as set forth in claim 17 and comprising another projection disposed in said material between said electrodes, and means for causing said projections to create an electrostatic field therebetween so that the electrostatic field extends between said projections and through said material to act thereon.

23. An apparatus as set forth in claim 17 and comprising means for vibrating said liquid bearing material between said electrodes to assist in the removal of said liquid from said liquid bearing material.

24. In a method for removing liquid from liquid bearing material and comprising the steps of providing a pair of spaced apart electrodes so as to be disposed on opposite sides of said material, disposing said material between said electrodes, creating an electrostatic field between said electrodes so as to act through said material to remove liquid from said material, and disposing a projection from one of said electrodes so as to be disposed in said material between said electrodes to assist in removing liquid from said liquid bearing material, the improvement comprising the step of projecting said projection from said one electrode to different position thereof relative to said material between said electrodes and relative to said one electrode at least some time during the time that said material is disposed between said electrodes.

25. A method as set forth in claim 24 and including the step of creating a non-uniform electrostatic field between said projection and at least one of said electrodes so as to act on said material.

26. A method as set forth in claim 24 and including the step of electrically insulating said projection from said one electrode that has said projection projecting therefrom.

27. A method as set forth in claim 24 and including the step of disposing said electrodes so that the same are in electrical contact with said material so that an electrical current flows through said material from one of said electrodes to the other of said electrodes while said electrostatic field is being maintained between said electrodes and is acting on said material.

28. A method as set forth in claim 27 and including the step of disposing said projection so that the same is also in electrical contact with said material.

29. A method as set forth in claim 24 and comprising the steps of disposing another projection in said material between said electrodes, and causing said projections to create an electrostatic field therebetween so that electrostatic field extends between said projections and through said material to act thereon.

30. A method as set forth in claim 24 and comprising the step of vibrating said liquid bearing material between said electrodes to assist in the removal of said liquid from said liquid bearing material.

31. In an apparatus for removing liquid from liquid bearing material and comprising a pair of spaced apart electrodes for being disposed on opposite sides of said material, means for creating an electrostatic field between said electrodes for acting through said material to remove liquid from said material, and a projection for being disposed in said material between said electrodes to assist in removing liquid from said liquid bearing material, one of said electrodes having opening means passing therethrough for receiving said projection therethrough so that said projection can project into said material between said electrodes, the improvement comprising means operatively interconnected to said projection to move said projection through said opening means of said one electrode to different positions thereof relative to said material between said electrodes and relative to said one electrode.

32. An apparatus as set forth in claim 31 and including means for creating a non-uniform electrostatic field between said projection and at least one of said electrodes.

33. An apparatus as set forth in claim 31 and including means for electrically insulating said projection from said one electrode that has said opening means passing therethrough.

34. An apparatus as set forth in claim 31 wherein said electrodes are adapted to be in electrical contact with said material so that an electrical current is adapted to flow through said material from one of said electrodes to the other of said electrodes while said electrostatic field is being maintained between said electrodes to act on said material.

35. An apparatus as set forth in claim 34 wherein said projection is also adapted to be in electrical contact with said material.

36. An apparatus as set forth in claim 31 and comprising another projection disposed in said material between said electrodes, and means for causing said projections to create an electrostatic field therebetween so that electrostatic field extends between said projections and through said material to act thereon.

37. An apparatus as set forth in claim 31 and comprising means for vibrating said liquid bearing material between said electrodes to assist in the removal of said liquid from said liquid bearing material.

38. In a method for removing liquid from liquid bearing material and comprising the steps of providing a pair of spaced apart electrodes so as to be disposed on opposite sides of said material, disposing said material between said electrodes, creating an electrostatic field between said electrodes so as to act through said material to remove liquid from said material, disposing a projection in said material between said electrodes to assist in removing liquid from said liquid bearing material, forming one of said electrodes with opening means passing therethrough, and disposing said projection through said opening means so that said projection projects into said material between said electrodes, the improvement comprising the step of removing said projection through said opening means of said one electrode to different positions thereof relative to said material between said electrodes and relative to said one electrode.

39. A method as set forth in claim 38 and including the step of creating a non-uniform electrostatic field between said projection and at least one of said electrodes so as to act on said material.

40. A method as set forth in claim 38 and including the step of electrically insulating said projection from said one electrode that has said opening means passing therethrough.

41. A method as set forth in claim 38 and including the step of disposing said electrodes so that the same are in electrical contact with said material so that an electrical current flows through said material form one of said electrodes to the other of said electrodes while said electrostatic field is being maintained between said electrodes and is acting on said material.

42. A method as set forth in claim 41 and including the step of disposing said projection so that the same is also in electrical contact with said material.

43. A method as set forth in claim 38 and comprising the steps of disposing another projection in said material between said electrodes, and causing said projections to create an electrostatic field therebetween so that electrostatic field extends between said projections through said material to act thereon.

44. A method as set forth in claim 38 and comprising the step of vibrating said liquid bearing material between said electrodes to assist in the removal of said liquid from said liquid bearing material.

* * * * *